United States Patent
Aispuro et al.

(10) Patent No.: US 12,547,915 B2
(45) Date of Patent: Feb. 10, 2026

(54) PREDICTIVE DATA ANALYSIS TECHNIQUES USING PREDICTIVE THRESHOLD OPTIMIZATION AND PROBABILISTIC AUTOMATED PROGRAMMING

(71) Applicant: UnitedHealth Group Incorporated, Minnetonka, MN (US)

(72) Inventors: Veronica Aispuro, Rancho Cucamonga, CA (US); Anthony Rossini, Saint Paul, MN (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 1255 days.

(21) Appl. No.: 17/192,543

(22) Filed: Mar. 4, 2021

(65) Prior Publication Data
US 2022/0284331 A1 Sep. 8, 2022

(51) Int. Cl.
*G06N 7/01* (2023.01)
*G06F 8/30* (2018.01)

(52) U.S. Cl.
CPC ........ *G06N 7/01* (2023.01); *G06F 8/30* (2013.01)

(58) Field of Classification Search
CPC .................................. G06N 4/01; G06F 8/30
See application file for complete search history.

(56) References Cited

U.S. PATENT DOCUMENTS

| | | | |
|---|---|---|---|
| 7,236,940 B2 | 6/2007 | Chappel | |
| 10,614,537 B2 | 4/2020 | Platt et al. | |
| 2014/0081652 A1 | 3/2014 | Klindworth | |
| 2014/0214444 A1 | 7/2014 | Thesman | |
| 2014/0330621 A1 | 11/2014 | Nichols et al. | |
| 2017/0053080 A1 | 2/2017 | Geppert et al. | |

(Continued)

OTHER PUBLICATIONS

Alexander, Carol, Michael Coulon, Yang Han, and Xiaochun Meng. "Evaluating the discrimination ability of proper multi-variate scoring rules." Annals of Operations Research 334, No. 1 (2024): 857-883. (Year: 2021).*

(Continued)

*Primary Examiner* — Casey R. Garner
(74) *Attorney, Agent, or Firm* — Alston & Bird LLP

(57) ABSTRACT

There is a need for more effective and efficient threshold-based predictive data analysis. This need can be addressed by, for example, solutions for performing predictive threshold optimization using probabilistic automated programming. In one example, a method includes determining an initial historical distribution for a measure based on historical measurement data associated with the measure; determining a calibrated historical distribution for the measure based on the initial historical distribution; determining projected distributions for the measure based on a projected trend for the predictive distribution, wherein the projected trend is determined based on the calibrated historical distribution; determining a projected cut point threshold predictions for the measure based on a predefined number of projected sampled simulations, wherein the predefined number of projected sampled simulations are determined based on the projected distributions; and performing one or more prediction-based actions based on the projected cut point threshold projections.

20 Claims, 12 Drawing Sheets

(56) References Cited

U.S. PATENT DOCUMENTS

2020/0257992 A1* 8/2020 Achin .................... G06Q 10/04
2023/0385738 A1* 11/2023 Lobell ................ G06Q 10/0637

OTHER PUBLICATIONS

"Medicare 2020 Part C & D Star Ratings Technical Notes," CMS Centers For Medicare & Medicaid Services—Center For Medicare, Oct. 1, 2019, (184 pages).

"Star Predictive Cut Points: Strategies To Overcome Uncertainty," Optum, White Paper, (2018), pp. 1-4. <URL: https: https://www.optum.com/content/dam/optum3/optum/en/resources/white-papers/optum-stars-predictive-cut-points-white-paper.pdf>.

"Stars Planner For Medicare Advantage," 2017 Baltimore Health Analytics LLC, (7 pages), (2017). <URL: http://baltimorehealthanalytics.com/stars_planner_v1.pdf>.

Paddock, Susan et al. "Considerations For How To Compute The Measure Cut Points Used To Assign Measure Stars," RAND Technical Expert Panel Star Ratings For Medicare Advantage and Prescription Drug Plans, RAND Corporation, May 31, 2018, (33 pages). <URL: https://www.rand.org/content/dam/rand/pubs/conf_proceedings/CF300/CF391/RAND_CF391.presentation.pdf>.

* cited by examiner

PREDICTIVE DATA ANALYSIS TECHNIQUES USING PREDICTIVE THRESHOLD OPTIMIZATION AND PROBABILISTIC AUTOMATED PROGRAMMING

BACKGROUND

Various embodiments of the present invention address technical challenges related to performing threshold-based predictive data analysis. Various embodiments of the present invention address the efficiency and reliability shortcomings of existing threshold-based predictive data analysis solutions.

BRIEF SUMMARY

In general, embodiments of the present invention provide methods, apparatus, systems, computing devices, computing entities, and/or the like for performing threshold-based predictive data analysis. Certain embodiments of the present invention utilize systems, methods, and computer program products that perform threshold-based predictive data analysis by utilizing at least one of calibrated historical distributions, historical sampled simulations, projected trends determined based at least in part on calibrated historical distributions, projected distributions determined based at least in part on projected trends, and projected cut point threshold predictions.

In accordance with one aspect, a method is provided. In one embodiment, the method comprises: determining an initial historical distribution for a measure based at least in part on historical measurement data associated with the measure; determining a calibrated historical distribution for the measure based at least in part on the initial historical distribution, wherein: (i) determining the calibrated historical distribution is performed based at least in part on comparing one or more predicted historical cut point threshold ranges and one or more ground-truth historical cut point threshold values, (ii) the one or more predicted historical cut point threshold ranges are determined based at least in part on a predefined number of historical sampled simulations, and (iii) the predefined number of historical sampled simulations are determined based at least in part on the initial historical distribution; determining one or more projected distributions for the measure based at least in part on a projected trend for the predictive distribution, wherein the projected trend is determined based at least in part on the calibrated historical distribution; determining a plurality of projected cut point threshold predictions for the measure based at least in part on a predefined number of projected sampled simulations, wherein the predefined number of projected sampled simulations are determined based at least in part on the one or more projected distributions; and performing one or more prediction-based actions based at least in part on the plurality of projected cut point threshold projections.

In accordance with another aspect, a computer program product is provided. The computer program product may comprise at least one computer-readable storage medium having computer-readable program code portions stored therein, the computer-readable program code portions comprising executable portions configured to: determine an initial historical distribution for a measure based at least in part on historical measurement data associated with the measure; determine a calibrated historical distribution for the measure based at least in part on the initial historical distribution, wherein: (i) determining the calibrated historical distribution is performed based at least in part on comparing one or more predicted historical cut point threshold ranges and one or more ground-truth historical cut point threshold values, (ii) the one or more predicted historical cut point threshold ranges are determined based at least in part on a predefined number of historical sampled simulations, and (iii) the predefined number of historical sampled simulations are determined based at least in part on the initial historical distribution; determine one or more projected distributions for the measure based at least in part on a projected trend for the predictive distribution, wherein the projected trend is determined based at least in part on the calibrated historical distribution; determine a plurality of projected cut point threshold predictions for the measure based at least in part on a predefined number of projected sampled simulations, wherein the predefined number of projected sampled simulations are determined based at least in part on the one or more projected distributions; and perform one or more prediction-based actions based at least in part on the plurality of projected cut point threshold projections.

In accordance with yet another aspect, an apparatus comprising at least one processor and at least one memory including computer program code is provided. In one embodiment, the at least one memory and the computer program code may be configured to, with the processor, cause the apparatus to: determine an initial historical distribution for a measure based at least in part on historical measurement data associated with the measure; determine a calibrated historical distribution for the measure based at least in part on the initial historical distribution, wherein: (i) determining the calibrated historical distribution is performed based at least in part on comparing one or more predicted historical cut point threshold ranges and one or more ground-truth historical cut point threshold values, (ii) the one or more predicted historical cut point threshold ranges are determined based at least in part on a predefined number of historical sampled simulations, and (iii) the predefined number of historical sampled simulations are determined based at least in part on the initial historical distribution; determine one or more projected distributions for the measure based at least in part on a projected trend for the predictive distribution, wherein the projected trend is determined based at least in part on the calibrated historical distribution; determine a plurality of projected cut point threshold predictions for the measure based at least in part on a predefined number of projected sampled simulations, wherein the predefined number of projected sampled simulations are determined based at least in part on the one or more projected distributions; and perform one or more prediction-based actions based at least in part on the plurality of projected cut point threshold projections.

BRIEF DESCRIPTION OF THE DRAWINGS

Figure 1:
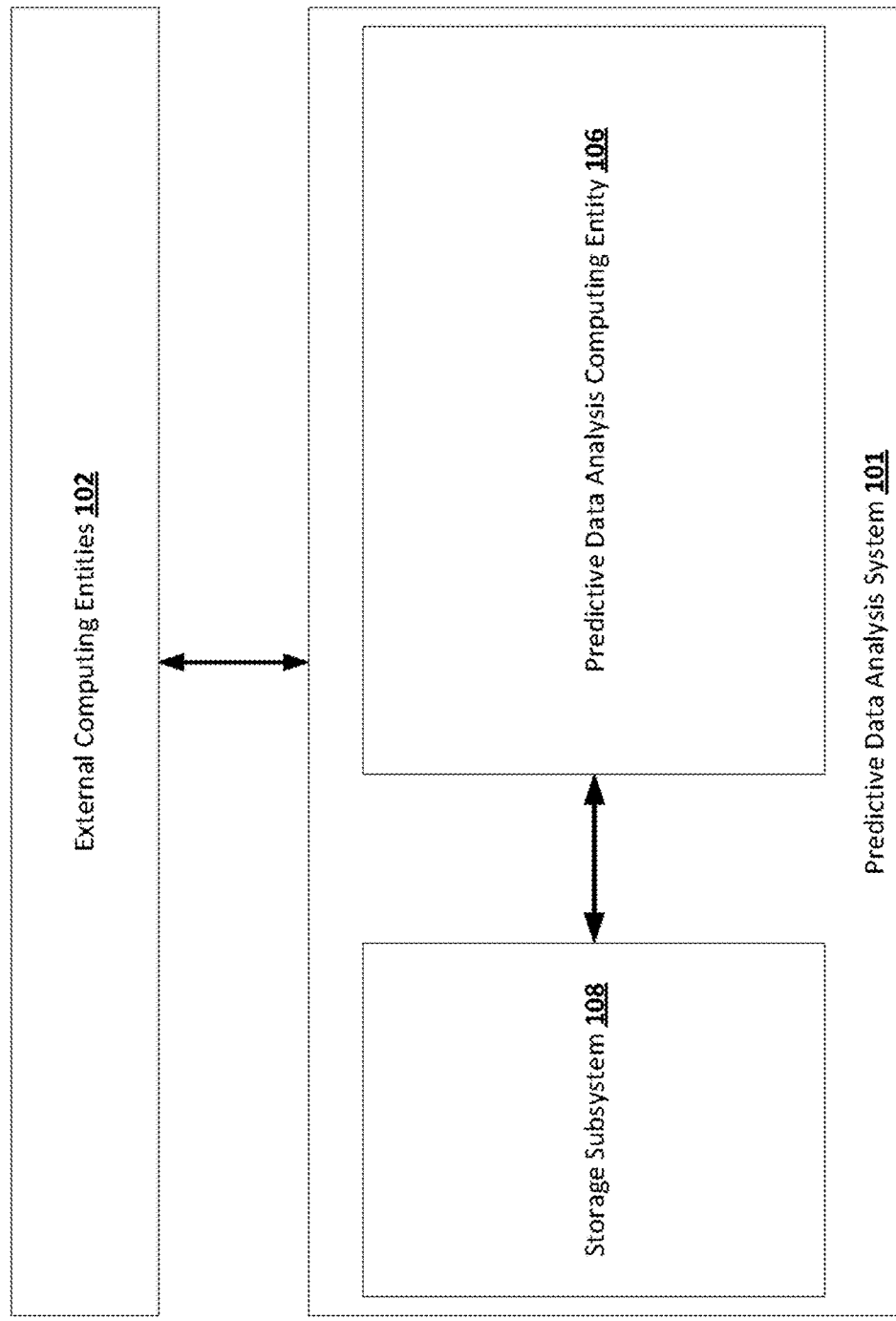

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
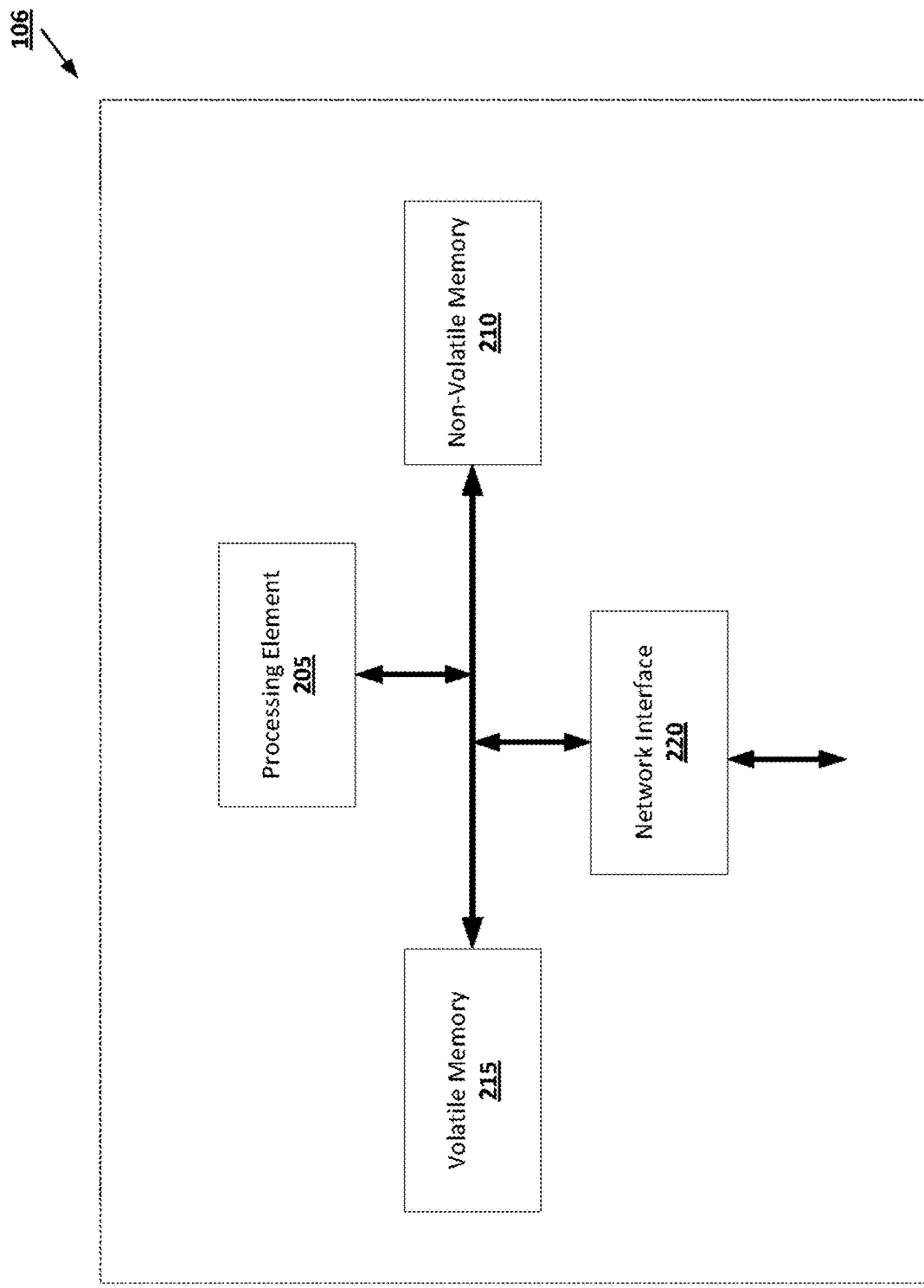

FIG. 2 provides an example predictive data analysis computing entity in accordance with some embodiments discussed herein.

Figure 3:
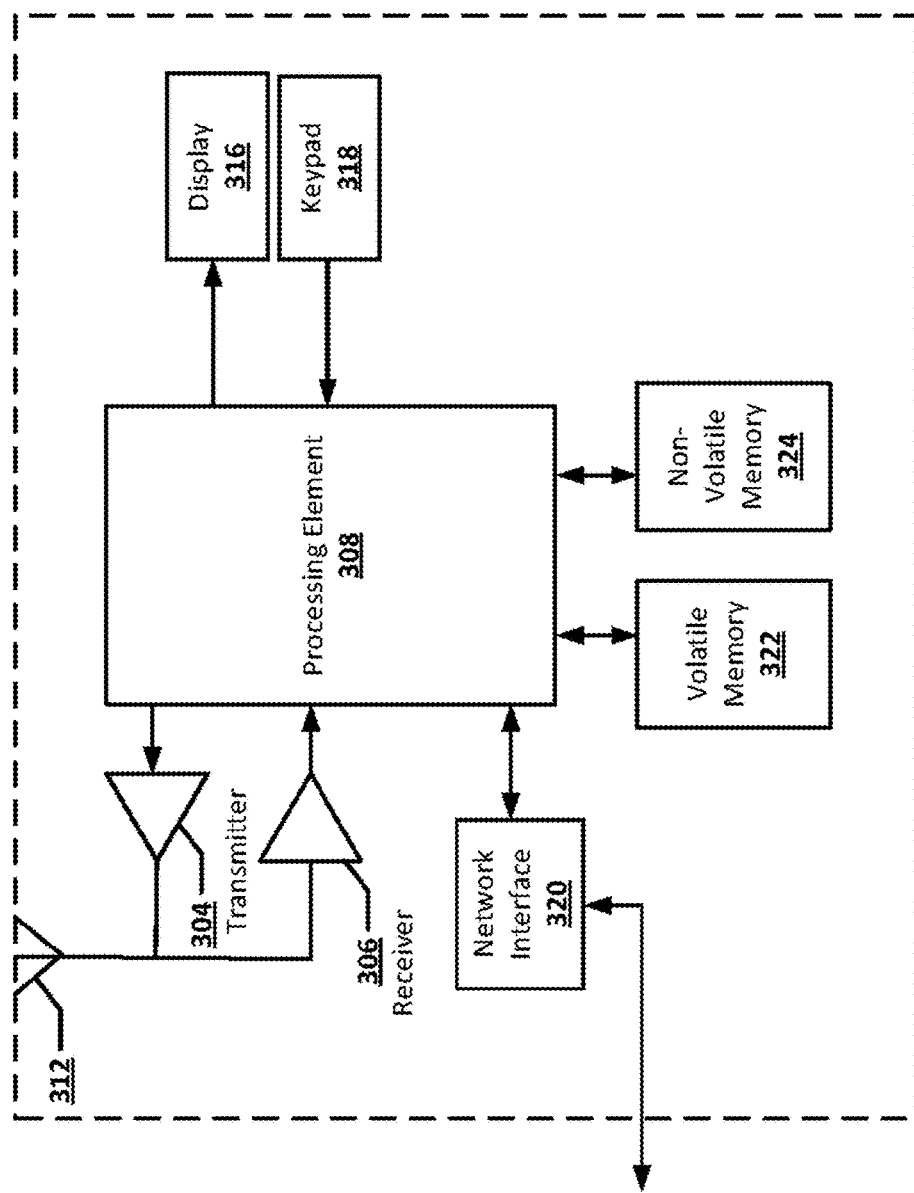

FIG. 3 provides an example external computing entity in accordance with some embodiments discussed herein.

Figure 4:
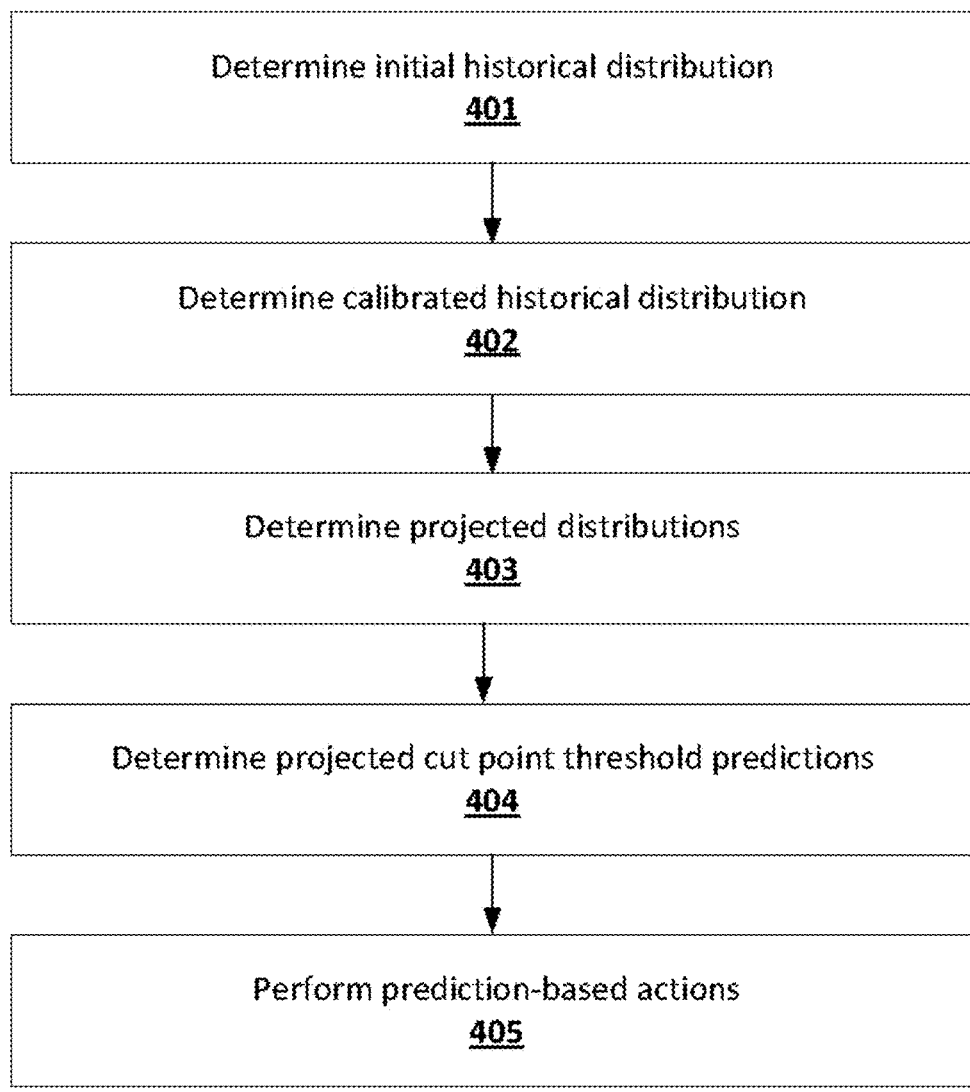

FIG. 4 is a flowchart diagram of an example process for performing predictive threshold optimization using probabilistic automated programming in accordance with some embodiments discussed herein.

Figure 5:
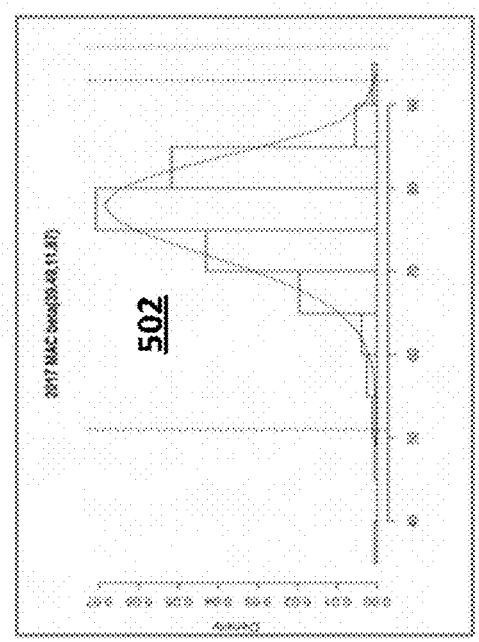
Figure 5:
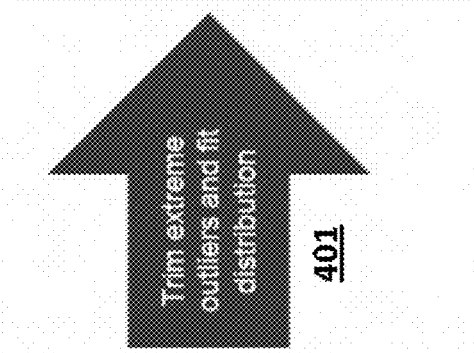
Figure 5:
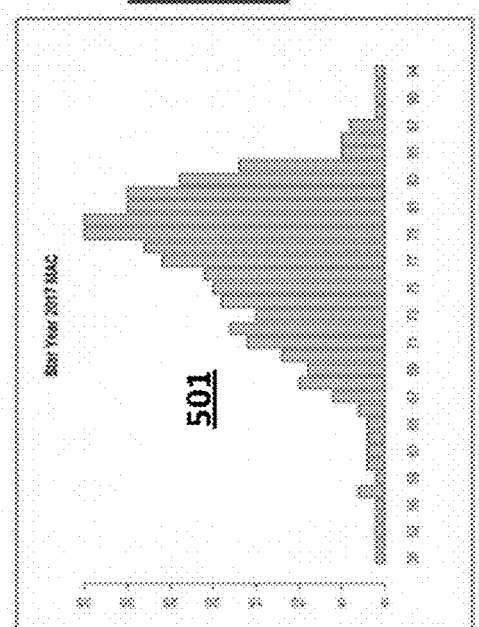

FIG. 5 provides an operational example of determining an initial historical distribution in accordance with some embodiments discussed herein.

Figure 6:
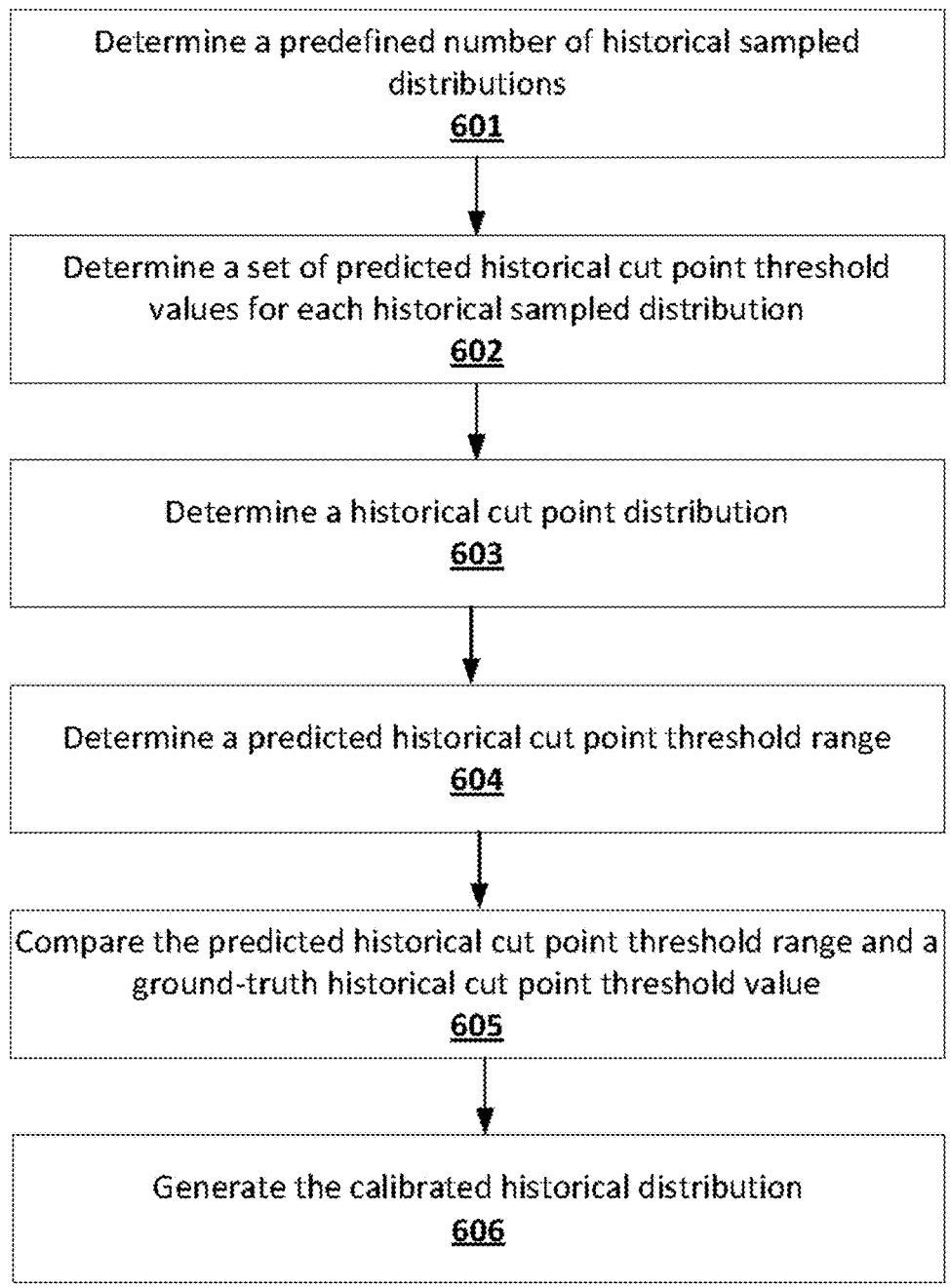

FIG. 6 is a flowchart diagram of an example process for determining a calibrated historical distribution based at least in part on an initial historical distribution in accordance with some embodiments discussed herein.

Figure 7:
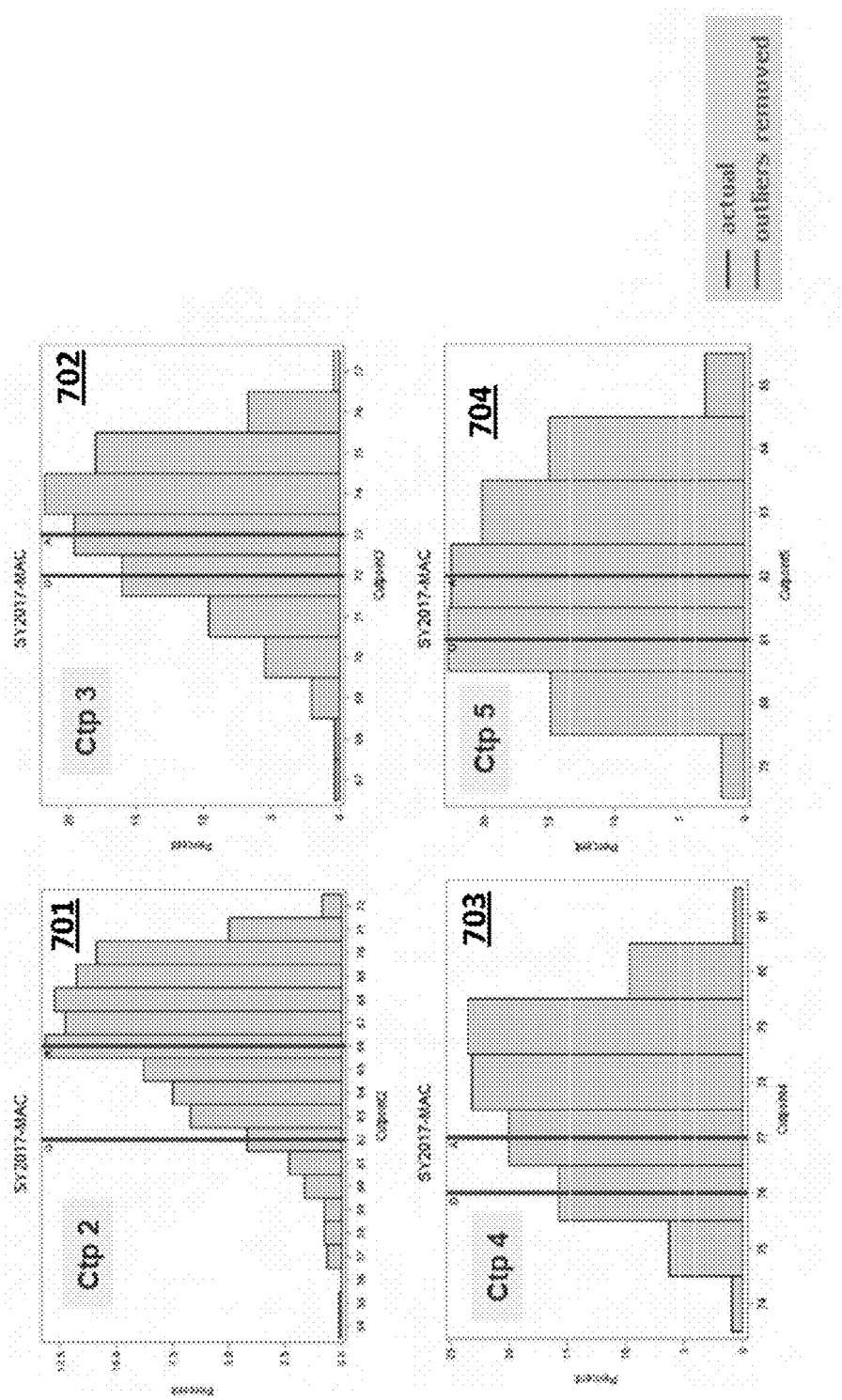

FIG. 7 provides operational examples of four historical cut point distributions in accordance with some embodiments discussed herein.

Figure 8:
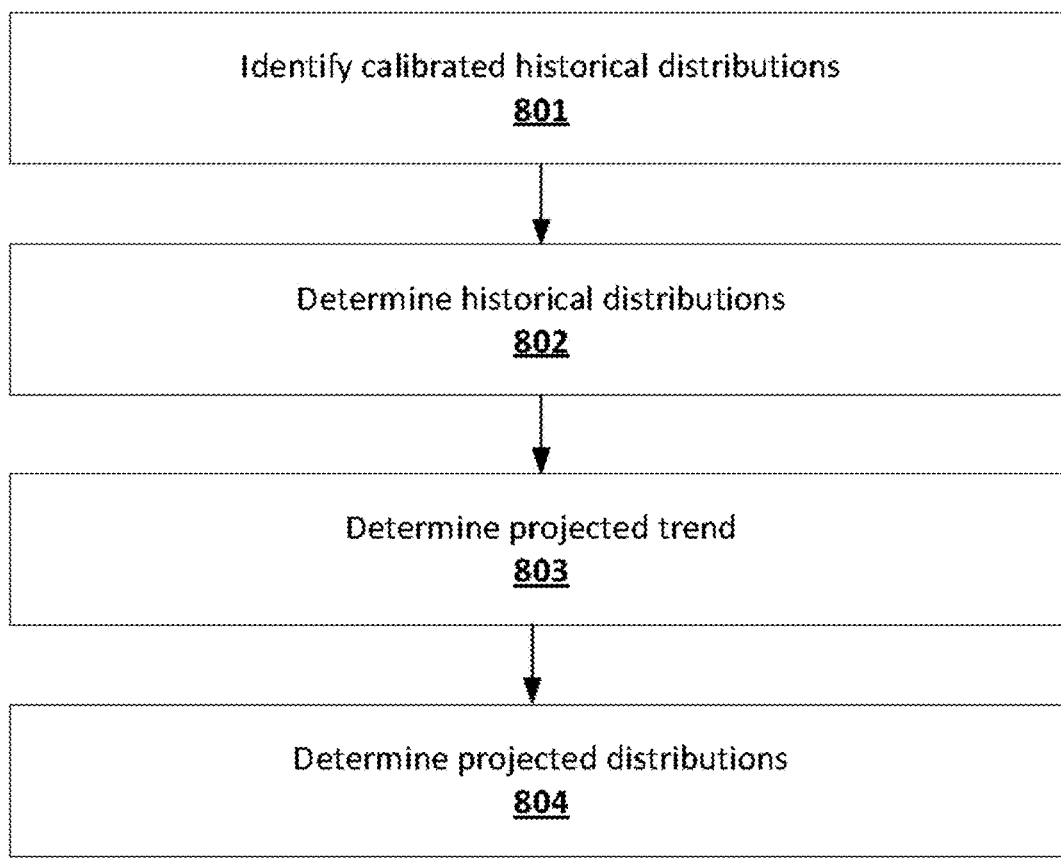

FIG. 8 is a flowchart diagram of an example process for determining a projected distribution for each projected temporal unit in accordance with some embodiments discussed herein.

Figure 9:
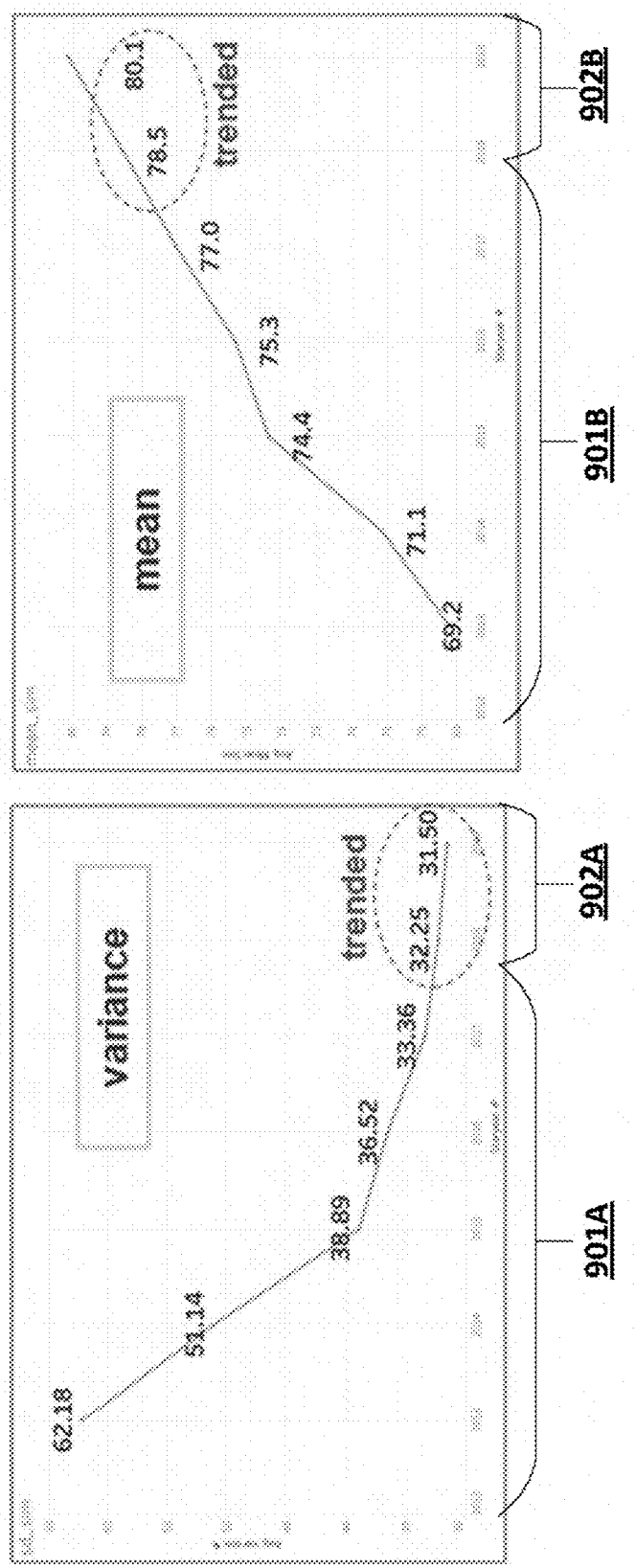

FIG. 9 provides an operational example of determining a historical trend and a projected trend in accordance with some embodiments discussed herein.

Figure 10:
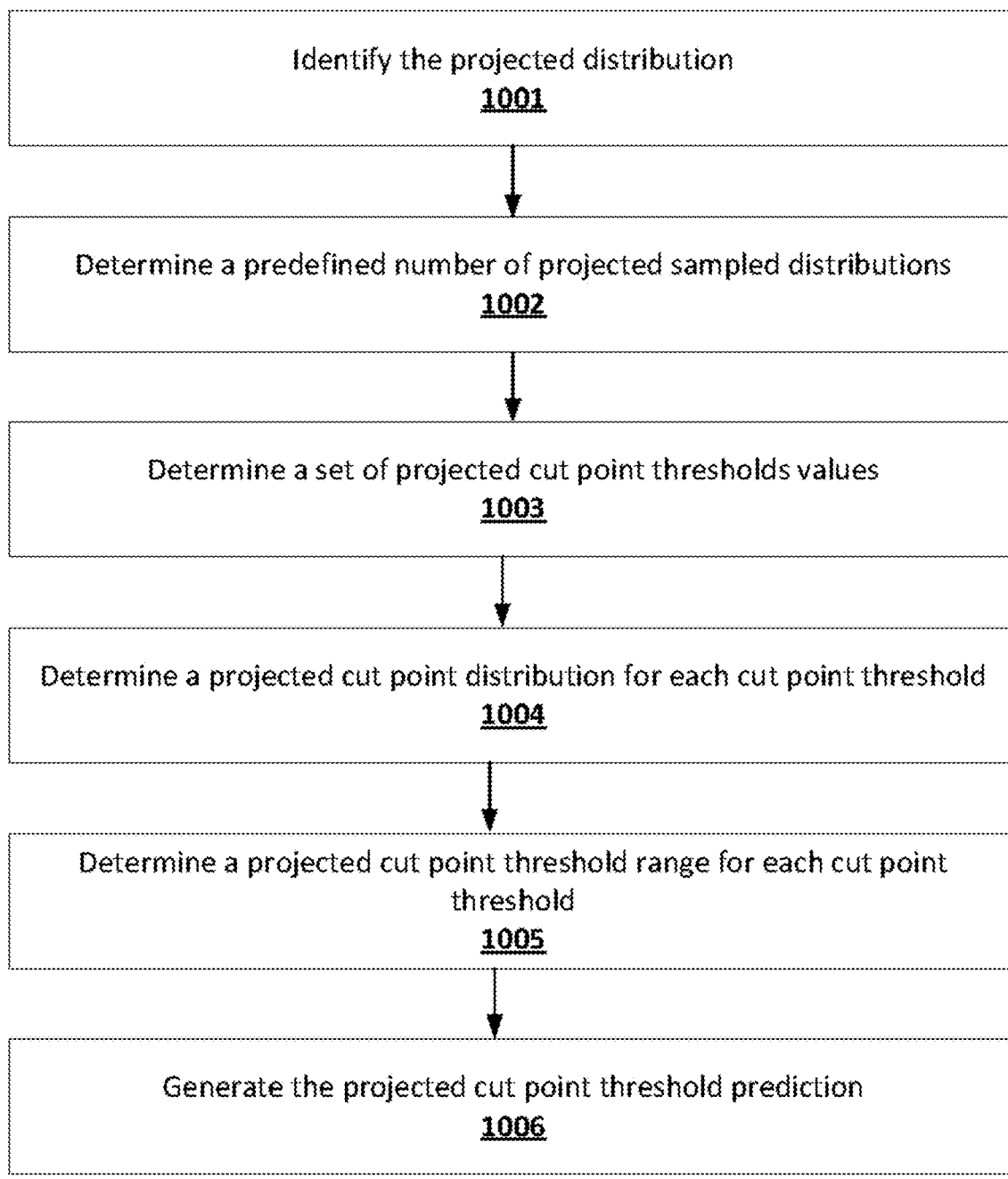

FIG. 10 is a flowchart diagram of an example process for determining a projected cut point threshold prediction for a particular projected temporal unit and a particular cut point threshold in accordance with some embodiments discussed herein.

Figure 11:
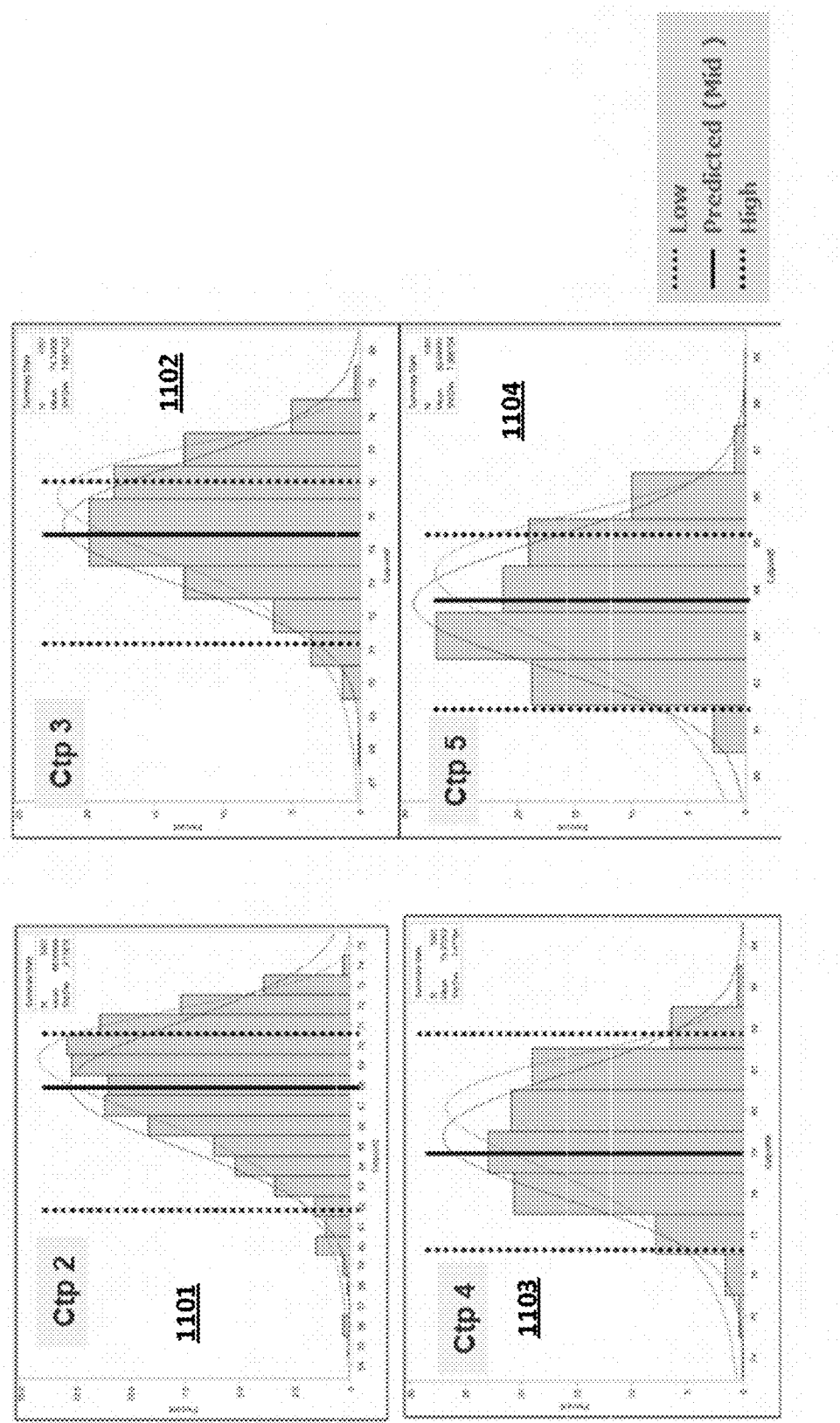

FIG. 11 provides an operational example of four projected cut point distributions in accordance with some embodiments discussed herein.

Figure 12:
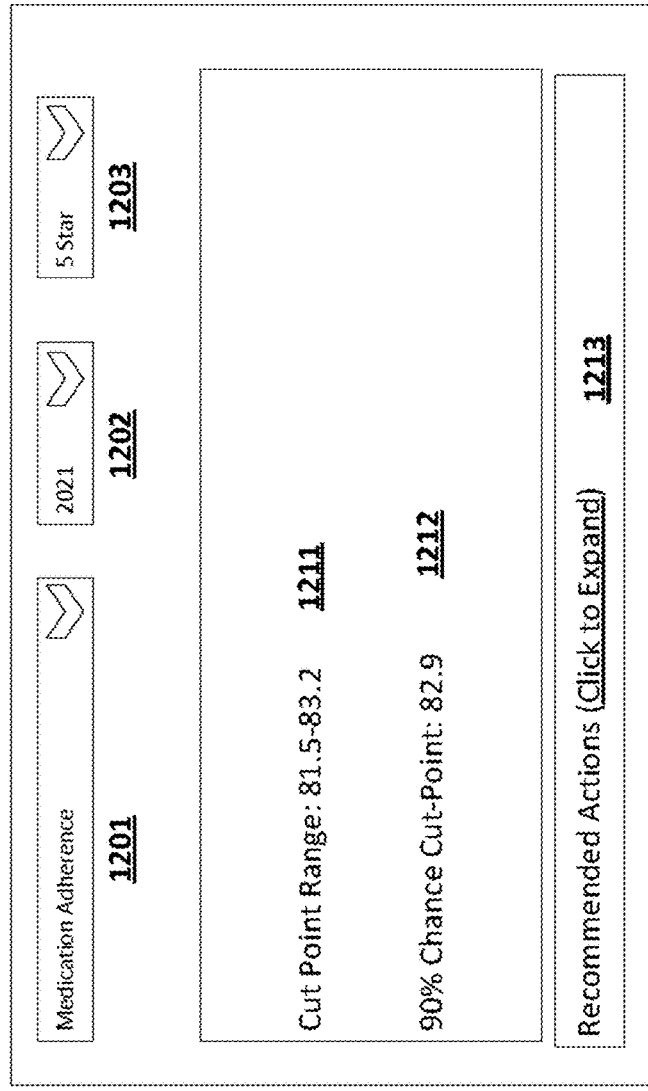

FIG. 12 provides an operational example of a prediction output user interface in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW

Various embodiments of the present invention address technical challenges related to efficiency and reliability of performing threshold-based predictive data analysis. Thresholds are heavily used in predictive data analysis, for example in order to convert raw prediction scores into inferred classifications. However, despite the heavy use of thresholds in predictive data analysis, various existing predictive data analysis solutions either define thresholds as hyper-parameters of predictive data analysis models or utilize computationally expensive training techniques for setting optimal threshold values. As a result, various existing predictive data analysis solutions are ineffective and/or inefficient when it comes to facilitating threshold-based predictive data analysis, for example in order to perform classification. This is especially the case when the underlying nature of the domain requires modifications to thresholds across time due to real-world developments.

To address the above-noted challenges associated with performing threshold-based predictive data analysis both efficiently and effectively, various embodiments of the present invention utilize simulations performed on historical data to calibrate historical input data and then utilize the calibrated historical input data to generate projected distributions and simulate the projected distributions to determine optimal threshold ranges. Through using the above-noted techniques and various other related techniques discussed in the present document, various embodiments of the present invention utilize relatively low-cost simulation operations to derive powerful predictive inferences about the relationships between historical data and historical thresholds, where the noted predictive inferences can then be used to generate optimal projected distributions and derive projected cut point threshold predictions based at least in part on the optimal projected distributions. In this way, various embodiments of the present invention address the technical challenges associated with performing threshold-based predictive data analysis both efficiently and effectively, substantially improve the efficiency and effectiveness of various existing predictive data analysis solutions, and make important technical contributions to various fields of machine learning and artificial intelligence (e.g., to improving efficiency and reliability of performing classification tasks).

An exemplary application of various embodiments of the present invention relates to determining thresholds of input measures needed to obtain particular star ratings. For example, the Centers for Medicare and Medicaid Services (CMS) Star Ratings program calculates an overall star rating for each contract in the industry and this star rating is used to determine quality bonus payments. The overall star rating is a measurement of performance across approximately 43 measures (e.g., 43-45 measures). Each individual measure is scored based at least in part on the contract's rate relative to performance of the industry and this rate is categorized as a 1, 2, 3, 4, or 5 star. These levels are determined by the industry contract scores and each level is split up by a set of cut points (sometimes called thresholds or benchmarks). These CMS star rating cut points are provided by CMS after the measurement period is over for all the measures. For example, if a measure is based at least in part on the contract's performance in 2019, the cut points will be made available in September of 2020. One problem that arises is that organizations do not know what level of performance is needed to attain a preferable level of 4 or 5 stars. The cut points can change from year-to-year and for the majority of measures and the majority years, they do indeed change. Generally the cut points trend in the direction of industry improvement trends, however cut points also change due to factors unrelated to industry trends. These other factors are related to the cut points calculation methodology which can be sensitive to outliers, distribution shape, skewness, multimodal distributions, and random factors due to ordering of data in clustering algorithm.

CMS uses a five-category clustering methodology for most of the measures to calculate cut points from the industry contract rates. For nine of the measures, CMS uses a percentile method for the CAHPS (Consumer Assessment of Healthcare Providers and Systems) measures. Each method can lead to some cut points volatility but the clustering methodology is more volatile than the percentile methodology. Simply applying the percentile methodology to all measures, however, would not be recommended because the clustering method works better than the percentile methodology in capturing the industry performance appropriately because generally the 5-bucket star distribution aligns with the contract rate performance distribution. This means that if the majority of contracts are scoring very high on a measure then a majority of the measure stars will also score high. In contrast, a percentile approach forces a specified percent of contracts to score low and high. The nine CAHPS measures are generally symmetrically distributed so the percentile methodology is appropriate for these measures since the distribution of those measures across industry contracts does not tend to have a large proportion of contracts on the high or low ends of the distribution.

In order for organizations to set reasonable targets and allocate resources accordingly, they need to know what levels of performance would provide them 4 or 5 star performance so that it can be determined which measures should maintain prior year performance and which ones should continue to improve. Since the cut points will change due to industry trends and cut point methodology volatility, it is important to predict what levels are needed to maintain a high level of star performance while minimizing risk and allocating resources in efficiently. When predicted targets are too high, risk is minimized but over allocation of resources can occur and when predicted targets are too low, risk is maximized but resource allocation is low.

One simple method to address the above-described problem is to rely on the previous year's cut points and attempt to do the same or better than last year. This is the least time intensive approach but has the highest risk of failing to improve scores enough to reach levels needed for the following year. Another approach is to trend calculated cut points using the last 3-five years of cut points; however, as mentioned earlier, the cut points can be sensitive to the cut points calculation methodology so the trend is not smooth and consistent from year-to-year. An optimal approach the simultaneously addresses both the industry trends and the cut points methodology volatility.

One aspect of the present invention relates to an approach to calculating cut points for all the CMS star rating measures where industry data is available. This approach combines statistical methods including parametric distribution fitting, linear trend regression, bootstrapping, and probabilistic automated programming. Each star rating measure is modeled using a parametric distribution based at least in part on predicted parameters with additional added outliers and longer distribution tails if applicable. These predicted cut points control for cut point sensitivity and capture variability and anticipate industry trends.

In some embodiments, using five years of historical industry distributions, a system calculates parameters of the distributions for each year. Before fitting a distribution extreme outliers may be removed. Extreme outliers are identified differently than standard outliers because they represent extreme cases that would not be captured by any simulated data distribution. There are various distributions that were used since measures do not necessarily follow one distribution. Measures that are more symmetrically distributed will follow a Normal distribution better but measures that are more skewed may follow a Beta distribution better. The Weibull distribution is also used occasionally since it provides the most flexible distribution but the parameters of the Weibull distribution are not as easy to calculate from the mean and variance of the data compared to the Beta and Normal distribution. Afterward, to understand how this measure behaves historically, data is simulated from the fitted distributions for each of the five years of historical data. The resulting cut points from each simulated run is saved and 1,000 simulations of the historical data for each measure are run. If the fit is good, then the actual cut points will land in between the range of derived, simulated cut points across the 1,000 runs and ideally, the actual cut points will land in the middle of the range and/or on the set of the cut points that occur most often in the simulations. If the actual cut points do not fall within the simulated range, this usually indicates that there are extreme outliers, standard outliers, and/or long distribution tails that have affected the cut points significantly. Although some of the distributions like Beta and Weibull can capture skewed distributions that have long tail end distributions, some of the measures have tails that extend beyond these distributions. The range of derived cut points is also important because it describes the variability.

Subsequently, best fit distribution is selected from the most current year and those distribution parameters are calculated for the last five years using the same distribution. The distribution parameters for the last five years are trended for two additional years to predict the shift and change in shape of the distribution for future years. Various trending methods were applied including simple linear trending for measures with steady improvement and log trending to account for measures that are improving but are starting to level-off. Linear, exponential, and logarithmic trending methods were applied and the $R^2$ of each method is used to determine which method to use best for automation purposes. Then, 1,000 runs of simulated industry data is run for the measure across each of the next two projected star years. This provides a set of likely cut points and provides a valuable range as well as the probability of each cut point level within that range.

One innovative aspect of various embodiments of the present invention is that it addresses a wide range of the components that can cause cut points to increase and decrease caused by both intended and unintended reasons. The intended reasons include normal industry performance changes from year-to-year which are generally upward trends but may also include one-time methodology changes. Unintended reasons include the sensitivity identified from the CMS cut points methodology and also unexpected industry performance changes due to uncontrollable circumstances such as natural disasters. The unintended cut points sensitivity and volatility have been researched for several years by the inventors to understand each component and quantify through industry simulations. During their research, the inventors notified CMS of these unexpected outcomes of the cut points algorithm. Now, CMS has proposed solutions to address some of the volatility issues raised by the inventors, an approach that may reduce the volatility in the future but it does not address all of the volatility sources. The inventors have also proposed alternate solutions to CMS, however CMS has decided to go with their original proposed solution. To clarify, even the proposed adjustments would only address volatility in cut points for finalized years, and there is still an on-going need to create predicted cut points and addressing the latest cut points CMS methodology, as disclosed by various embodiments of the present invention.

Another innovative aspect of various embodiments of the present invention relates to simulating industry data using parametric distribution models to come up with cut points or benchmarks. There are not currently any approaches like this in the health care quality ratings area or other business areas. The clustering method can be sensitive to small gaps in the data distribution where the clustering approach may unintendedly magnify such gaps in the data. The simulated fitted parametric approach smooths out the distribution which can provide a better approach to calculating stable cut points, an approach that is part of the reason the described method is also used to predict cut points for future years. Non-parametric methods were not applied since almost all cases provided good fit parametric distributions. Additionally, non-parametric methods may magnify slight gaps in the data and place cutpoints too often within these gaps.

A yet another innovative aspect of various embodiments of the present invention is that it applies probabilistic automated programming to quantity the variability and understand the risks of not only the predicted cut points but also any finalized cut points. In addition to predicting a specific set of cut points, various embodiments of the present invention also provide and research the frequency distributions of the simulation output to describe the range of likely cut points as well as to describe which cut points are likely to occur with the highest frequencies. Probabilities can be assigned to each star rating at various levels, for example at organizational levels, contract levels, measure levels, and/or the like.

II. DEFINITIONS

The term "measure" may refer to a data entity that is configured to describe a feature type that may be utilized (e.g., by an evaluation computing entity) to perform an evaluation for an evaluation period (e.g., a star rating for a star year), where the evaluation may in turn be configured to assign a qualitative classification (e.g., a star rating) to a predictive entity (e.g., to a health insurance provider). For example, the CMS Star Ratings program calculates an overall star rating for each health insurance provider in the industry and this star rating is used to determine quality bonus payments. The overall star rating is a measurement of performance across approximately 43 measures, where each measure is scored based at least in part on the health insurance provider's rate relative to performance of the industry and this rate is classified as one star, two stars, three stars, four stars, or five stars. Accordingly, a measure may be utilized (e.g., along with one or more other measures) in order to predict an optimal evaluation classification for a predictive entity.

The term "historical measurement data" may refer to a data entity that is configured to describe features values associated with a corresponding measure across a group of predictive entities. For example, with respect to a measure that is used to determine overall stars rating for health insurance providers, the historical measurement data for the noted measurement may describe the values assigned to various health insurance providers across an industry segment with respect to the noted measure. Accordingly, historical measurement data may refer to the raw feature value data for a corresponding measure across a predictive entity segment which can then be used to determine one or more initial historical distributions for the measure in relation to the predictive entity segment (e.g., a per-year initial historical distribution for each per-year subset of the historical measurement data in relation to the predictive entity segment).

The term "initial historical distribution" may refer to a data entity that is configured to describe a defined probability distribution imposed on a corresponding historical measurement data subset in order to describe the shape of the corresponding historical measurement data subset using a parameterized probability distribution. For example, in some embodiments, given five years of historical measurement data for a measure, an initial historical distribution is imposed on each year of the noted five years. The best fit distribution is selected based on the latest year of data. That selected best fit distribution is then imposed on the five years of historical data to have parameters that will trend more easily for the predictive years. Examples of initial historical distributions are the normal distribution for historical measurement data subsets that have a relatively symmetric shape as well as the Beta distribution and the Weibull distribution for historical measurement data subsets that have relatively skewed shapes. In some embodiments, before generating an initial historical distribution for a corresponding historical measurement data subset, extreme outliers are removed from the corresponding historical measurement data subset. In some of the noted embodiments, extreme outliers are identified differently than standard outliers because the extreme outliers represent extreme cases that would not be captured by any simulated data distribution.

The term "historical sampled simulation" may refer to a data entity that is configured to describe a selected subset of the measure values described by the initial historical distribution. For example, given a measure that describes medication adherence for a group of health insurance providers for a particular year, a historical sampled simulation may describe medication adherence values for a subset of the group of health insurance providers, for example for 400 health insurance providers. In some embodiments, determining a historical sampled simulation based at least in part on an initial historical distribution is performed based at least in part on a random sampling of values from the initial historical distribution, where the random sampling is performed in accordance with the probability relationships defined by the type of the initial historical distribution and the parameters of the initial historical distribution. In some embodiments, a predefined number of historical sampled simulations are generated to process in order to detect cut point threshold values for each historical sampled simulation of the predefined number of historical sampled simulations.

The term "historical cut point threshold value" may refer to a data entity that is configured to describe a minimum measure value that is estimated based at least in part on the distribution of measurement values across a corresponding historical sampled simulation to be sufficient to achieve a particular evaluation classification. For example, when a historical sampled simulation describes 400 randomly-selected medication adherence values for 400 health insurance providers, the historical cut point threshold values inferred based at least in part on the noted historical sampled simulation may identify the measure value that is estimated to be sufficient to achieve a two-star rating based at least in part on the shape (e.g., variance, mean, and/or the like) of the 400 randomly-selected medication adherence values, the measure value that is estimated to be sufficient to achieve a three-star rating based at least in part on the shape (e.g., variance, mean, and/or the like) of the 400 randomly-selected medication adherence values, the measure value that is estimated to be sufficient to achieve a four-star rating based at least in part on the shape (e.g., variance, mean, and/or the like) of the 400 randomly-selected medication adherence values, and the measure value that is estimated to be sufficient to achieve a five-star rating based at least in part on the shape (e.g., variance, mean, and/or the like) of the 400 randomly-selected medication adherence values. In some embodiments, determining the historical cut point threshold values inferred based at least in part on a historical sampled simulation includes selecting the historical cut point threshold values in a manner that is configured to divide the measure values described by the historical sampled simulation into n subsets (e.g., n equal subsets), where n is the number of evaluation classifications determined by a corresponding evaluation classification scheme (e.g., given a star rating system that assigns each predictive entity to one of a one-star classification, a two-star classification, a three-star classification, a four-star classification, and a five-star classification, n may equal five in this example).

The term "historical cut point distribution" may refer to a data entity that is configured to describe the shape of the predicted historical cut point threshold values for a corresponding cut point threshold across a set of historical sampled simulations. For example, consider a case where ten historical sampled simulations are drawn and where the predicted cut point threshold values for a second cut point threshold (e.g., the cut point threshold for a two-star classification) across the ten historical sampled simulations are 81, 83, 82, 82, 84, 85, 82, 83, 81, and 82. In the noted example, the historical cut point distribution for the second cut point threshold may be a histogram that is configured to describe that the predicted historical cut point threshold values for the second cut point threshold across the ten historical sampled simulations includes two values of 81, four values of 82, two values of 83, one value of 84, and one value of 85. In some embodiments, given a particular evaluation classification scheme that assigns each predictive entity to one of a one-star classification, a two-star classification, a three-star classification, a four-star classification, and a five-star classification, a predictive data analysis computing entity may determine a historical cut point distribution for each of the four cut point thresholds defined by noted five classifications (e.g., a first historical cut point distribution for the two-star classification, a second historical cut point distribution for the three-star classification, a third historical cut point distribution for the four-star classification, and a fourth historical cut point distribution for the five-star classification).

The term "historical cut point threshold range" may refer to a data entity that is configured to describe a defined-frequency range of predicted historical cut point threshold values for a corresponding cut point threshold as determined based at least in part on the historical cut point distribution for the corresponding cut point threshold, where the defined-frequency range is deemed to account for a predefined ratio (e.g., 60 percent) of the predicted historical cut point threshold values. For example, consider a case where the historical cut point distribution for a second cut point threshold may be a histogram that is configured to describe that the predicted historical cut point threshold values for the second cut point threshold across the ten historical sampled simulations includes two values of 1, four values of two, two values of three, one value of four, and one value of five. In the noted example, the predicted historical cut point threshold range may be [1, 3], as eighty percent of the predicted historical cut point threshold values described by the noted historical cut point distribution fall within the identified range. In some embodiments, identifying a defined-frequency range of predicted historical cut point threshold values for a corresponding cut point threshold as determined based at least in part on the historical cut point distribution for the corresponding cut point threshold includes identifying a range of the predicted historical cut point threshold values for the corresponding cut point threshold that covers a requisite percentage (e.g., 60 percent) of the predicted historical cut point threshold values described by the historical cut point distribution for the corresponding cut point threshold. In some embodiments, identifying a defined-frequency range of predicted historical cut point threshold values for a corresponding cut point threshold as determined based at least in part on the historical cut point distribution for the corresponding cut point threshold includes identifying a range of the predicted historical cut point threshold values for the corresponding cut point threshold that: (i) covers a requisite percentage (e.g., 60 percent) of the predicted historical cut point threshold values described by the historical cut point distribution for the corresponding cut point threshold, and (ii) includes one or more measures of statistical distribution (e.g., a mean, a median, a mode, and/or the like) of the historical cut point distribution for the corresponding cut point threshold.

The term "ground-truth historical cut point threshold value" may refer to a data entity that is configured to describe an observed value of a corresponding cut point threshold. For example, given a cut point threshold value that describes the threshold value of a measure that describes medication adherence for obtaining four-star rating during the year 2017, the ground-truth historical cut point threshold value for the noted cut point threshold value may describe the actual cut point threshold value for medication adherence needed to obtain a four-star rating, a value that is typically announced by CMS one or two years after the relevant rating year. In some embodiments, a predictive data analysis computing entity compares the ground-truth historical cut point threshold for a corresponding cut point threshold with the predicted historical cut point threshold range for the corresponding cut point threshold to determine whether the ground-truth historical cut point threshold falls within the predicted historical cut point threshold range in order to perform calibrations on the initial historical distribution for the cut point threshold if the comparison shows that the ground-truth historical cut point threshold does not fall within the predicted historical cut point threshold range.

The term "calibrated historical distribution" may refer to a data entity that is configured to describe a distribution of applicable measure values for a predictive entity segment that is generated by one of the following: (i) determining that a corresponding initial historical distribution is sufficiently descriptive of ground-truth historical cut point thresholds associated with a corresponding measure and thus adopting the corresponding initial historical distribution as the calibrated historical distribution, or (ii) determining that a corresponding initial historical distribution is not sufficiently descriptive of ground-truth historical cut point thresholds associated with the measure and thus applying data/distribution calibrations on the historical measurement data used to determine the corresponding initial historical distribution and/or on the corresponding initial historical distribution in order to generate the calibrated historical distribution. For example, given a measure that describes medication adherence values for the year 2017, the calibrated historical distribution may be determined by: (i) determining whether an initial historical distribution for the measure is sufficiently descriptive of ground-truth historical cut point thresholds associated with the measure; (ii) in response to determining that the initial historical distribution for the measure is sufficiently descriptive of ground-truth historical cut point thresholds associated with the measure, adopting the initial historical distribution as the calibrated historical distribution; and (iii) in response to determining that the initial historical distribution for the measure is not sufficiently descriptive of ground-truth historical cut point thresholds associated with the measure, performing at least one of: (i) adjusting the data used to generate the initial historical distribution (e.g., by adding data to the tail of the initial historical distribution) and using the adjusted data to generate the calibrated historical distribution, or (ii) modifying the parameters and/or the type of the initial historical distribution to generate the calibrated historical distribution.

The term "historical trend" may refer to a data entity that is configured to describe one or more desired values/parameters described by the calibrated historical distributions across various historical temporal units, where the desired values/parameters may be determined based at least in part on a determined projected distribution. In some embodiments, given a projected distribution with n parameters, the historical trend may describe a first graph that describes the value of the first parameter of the n parameters across the calibrated historical distributions for the range of historical temporal units, a second graph that describes the value of the second parameter of the n parameters across the calibrated historical distributions for the range of historical temporal units, and all the way to an nth graph that describes the value of the nth parameter of the n parameters across the calibrated historical distributions for the range of historical temporal units. For example, given a projected normal distribution and given calibrated historical distributions for each of the years 2014-2019, the historical trend may include a first graph that describes the mean of the calibrated historical distribution for the year 2014, the mean of the calibrated historical distribution for the year 2015, the mean of the calibrated historical distribution for the year 2016, the mean of the calibrated historical distribution for the year 2017, the mean of the calibrated historical distribution for the year 2018, and the mean of the calibrated historical distribution for the year 2019, as well as a second graph that describes the variance of the calibrated historical distribution for the year 2014, the variance of the calibrated historical distribution for the year 2015, the variance of the calibrated historical distribution for the year 2016, the variance of the calibrated historical distribution for the year 2017, the variance of the calibrated historical distribution for the year 2018, and the variance of the calibrated historical distribution for the year 2019. In some embodiments, the type of the projected distribution is determined based at least in part on the type of the calibrated historical distribution for a selected historical temporal unit (e.g., a latest historical temporal unit, such as the year 2019 in the example referring to the calibrated historical distributions for each of the historical years 2014-2019).

The term "projected trend" may refer to a data entity that is configured to describe projected values for one or more desired values/parameters described by a corresponding historical trend across one or more projected temporal units (e.g., one or more future years). For example, consider a historical trend that includes a first graph that describes the mean of the calibrated historical distribution for the year 2014, the mean of the calibrated historical distribution for the year 2015, the mean of the calibrated historical distribution for the year 2016, the mean of the calibrated historical distribution for the year 2017, the mean of the calibrated historical distribution for the year 2018, and the mean of the calibrated historical distribution for the year 2019, as well as a second graph that describes the variance of the calibrated historical distribution for the year 2014, the variance of the calibrated historical distribution for the year 2015, the variance of the calibrated historical distribution for the year 2016, the variance of the calibrated historical distribution for the year 2017, the variance of the calibrated historical distribution for the year 2018, and the variance of the calibrated historical distribution for the year 2019. In the noted example, the projected trend may describe the mean of the projected distribution for the year 2020, the mean of the projected distribution for the year 2021, the variance of the projected distribution for the year 2020, and the variance of the projected distribution for the year 2021. In some embodiments, to generate the historical trend and/or the projected trend, one or more trending methods are utilized. Examples of trending methods include linear trending (e.g., for measures with steady improvement), exponential trending, and logarithmic trending (e.g., to account for measures that are improving over the years but are starting to level-off across time). In some embodiments, the $R^2$ of each trending method is used to determine which method to use best for automation purposes.

The term "projected distribution" may refer to a data entity that is configured to describe a predicted distribution of measure values for a corresponding measure in a projected temporal unit (e.g., a future year). In some embodiments, the distribution type of the projected distribution may be determined based at least in part on a distribution type of a calibrated historical distribution that is associated with the corresponding measure as well as with a latest historical temporal unit at the time of determining the projected distribution. In some embodiments, the parameters of the projected distribution may be determined based at least in part on the projected trend for a set of projected temporal units that include the corresponding temporal unit for the projected distribution.

The term "projected sampled simulation" may refer to a data entity that is configured to describe a subset of the measure values described by a projected distribution. For example, given a measure that describes medication adherence for a group of health insurance providers for a particular year, a projected sampled simulation may describe projected medication adherence values for a subset of the group of health insurance providers, for example for 400 health insurance providers in a particular prospective year. In some embodiments, determining a projected sampled simulation based at least in part on a projected distribution is performed based at least in part on a random sampling of values from the projected distribution, where the random sampling is performed in accordance with the probability relationships defined by the type of the projected distribution and the parameters of the projected distribution. In some embodiments, a predefined number of projected simulations are generated for each particular measure across a particular projected temporal unit and used to determine a particular projected cut point threshold prediction for the measure and the particular projected temporal unit.

The term "projected cut point threshold prediction" may refer to a data entity that is configured to describe a predictive conclusion about the predicted utility of achieving a particular measure value to achieving a particular cut point threshold. For example, the projected cut point threshold prediction may describe a range of measure values and/or point-estimate predicted values that are predicted to have a high probability of achieving a particular cut point threshold (e.g., a high probability of achieving a particular star rating). As another example, projected cut point threshold prediction may describe a range of measure values that are predicted to have a defined probability of achieving a particular cut point threshold (e.g., sixty percent likelihood of achieving a particular star rating).

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specificallyconfigured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions. An example of a prediction that can be generated using the predictive data analysis system 101 is a prediction about optimal cut point threshold values for a future temporal period (e.g., a future year) in relation to a measure (e.g., a medication adherence measure used to determine CMS Star Rating) and a cut point threshold (e.g., a five-star rating cut point threshold for obtaining five star rating from CMS by a health insurance provider).

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity— relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

FIG. 4 is a flowchart diagram of an example process 400 for performing optimal threshold prediction using probabilistic automated programming. Via the various steps/operations of the process 400, the predictive data analysis computing entity 106 can efficiently and reliably detect predicted values/ranges for cut point threshold values associated with one or more measures based at least in part on historical measurement data associated with the measure. While various embodiments of the process 400 have been discussed with reference to determining predicted cut point threshold values for a single measure, a person of ordinary skill in the relevant technology will recognize that the disclosed techniques can be utilized to detect optimal predicted cut point threshold values for two or more measures.

The process 400 begins at step/operation 401 when the predictive data analysis computing entity 106 determines an initial historical distribution for a measure based at least in part on historical measurement data associated with the measures. In some embodiments, the predictive data analysis computing entity 106 determines a best fit distribution for each subset of the historical measurement data that relates to a particular temporal unit. For example, given five years of historical measurement data, the predictive data analysis computing entity 106 may determine a best fit distribution for each subset of the historical measurement data that is associated with a corresponding year of the noted five years.

In some embodiments, to determine a best fit distribution for each historical period of two or more historical periods (e.g., for each historical year of two or more historical years), the predictive data analysis computing entity 106 first determines the best fit distribution for the latest historical period of the two or more historical distribution and then adopts the distribution type of the latest historical period as the distribution type for each of the preceding historical periods. For example, for historical years 2015-2019, if the best fit distribution for the historical year 2019 is a Beta distribution, then the Beta distribution parameters are derived for historical years 2015-2018.

In some embodiments, a measure describes a feature type that may be utilized (e.g., by an evaluation computing entity) to perform an evaluation for an evaluation period (e.g., a star rating for a star year), where the evaluation may in turn be configured to assign a qualitative classification (e.g., a star rating) to a predictive entity (e.g., to a health insurance provider). For example, the CMS Star Ratings program calculates an overall star rating for each health insurance provider in the industry and this star rating is used to determine quality bonus payments. The overall star rating is a measurement of performance across approximately 43 measures, where each measure is scored based at least in part on the health insurance provider's rate relative to performance of the industry and this rate is classified as one star, two stars, three stars, four stars, or five stars. Accordingly, a measure may be utilized (e.g., along with one or more other measures) in order to predict an optimal evaluation classification for a predictive entity.

In some embodiments, historical measurement data describe features values associated with a corresponding measure across a group of predictive entities. For example, with respect to a measure that is used to determine overall stars rating for health insurance providers, the historical measurement data for the noted measurement may describe the values assigned to various health insurance providers across an industry segment with respect to the noted measure. Accordingly, historical measurement data may refer to the raw feature value data for a corresponding measure across a predictive entity segment which can then be used to determine one or more initial historical distributions for the measure in relation to the predictive entity segment (e.g., a per-year initial historical distribution for each yearly subset of the historical measurement data in relation to the predictive entity segment).

In some embodiments, an initial historical distribution describes parameters and type of a defined probability distribution imposed on a corresponding historical measurement data subset in order to describe the shape of the corresponding historical measurement data subset using a parameterized probability distribution. For example, in some embodiments, given five years of historical measurement data for a measure, an initial historical distribution is imposed on each year of the noted five years. Examples of initial historical distributions are the normal distribution for historical measurement data subsets that have a relatively symmetric shape as well as the Beta distribution and the Weibull distribution for historical measurement data subsets that have relatively skewed shapes. In some embodiments, before generating an initial historical distribution for a corresponding historical measurement data subset, extreme outliers are removed from the corresponding historical measurement data subset. In some of the noted embodiments, extreme outliers are identified differently than standard outliers because these noted extreme outliers would not be captured by any simulated data distribution.

An operational example of performing the step/operation 401 is depicted in FIG. 5. As depicted in FIG. 5, the histogram 501 describes the shape of the historical measurement data for a medication adherence measurement for the evaluation year 2017. As further depicted in FIG. 5, the predictive data analysis computing entity 106 performs the step/operation 401 by removing extreme outliers from the historical measurement data associated with the histogram 501 and fitting a distribution on the historical measurement data associated with the histogram 501. As a result, the initial distribution 502, which is a Beta distribution, is generated to describe the historical measurement data for the medication adherence measurement for the evaluation year 2017.

Returning to FIG. 4, at step/operation 402, the predictive data analysis computing entity 106 determines a calibrated historical distribution for the measure based at least in part on the initial historical distribution. For example, the predictive data analysis computing entity 402 may determine whether the initial historical distribution is estimated to be capable of accurately predicting cut point threshold values for the measure, and if not, what modifications to the historical measurement data and/or to the initial historical distribution may be appropriate in order to increase the estimated predictive capability of an inferred distribution.

In some embodiments, step/operation 402 may be performed in accordance with the process depicted in FIG. 6. The process depicted in FIG. 5 begins at step/operation 601 when the predictive data analysis computing entity 106 determines a predefined number of historical sampled simulations based at least in part on the initial historical distribution. For example, in some embodiments, the predictive data analysis computing entity 106 determines 1,000 historical sampled simulation based at least in part on the initial historical distribution.

A historical sampled simulation describes a selected subset of the measure values described by the initial historical distribution. For example, given a measure that describes medication adherence for a group of health insurance providers for a particular year, a historical sampled simulation may describe medication adherence values for a subset of the group of health insurance providers, for example for 400 health insurance providers. In some embodiments, determining a historical sampled simulation based at least in part on an initial historical distribution is performed based at least in part on a random sampling of values from the initial historical distribution, where the random sampling is performed in accordance with the probability relationships defined by the type of the initial historical distribution and the parameters of the initial historical distribution. In some embodiments, a predefined number of historical sampled simulations are generated to process in order to detect cut point threshold values for each noted historical sampled simulation of the predefined number of historical sampled simulations.

At step/operation 602, the predictive data analysis computing entity 106 determines a set of predicted historical cut point threshold values for each historical sampled simulation. A historical cut point threshold value may describe a minimum measure value that is estimated based at least in part on the distribution of measurement values across a corresponding historical sampled simulation to be sufficient to achieve a particular evaluation classification. For example, when a historical sampled simulation describes 400 randomly-selected medication adherence values for 400 health insurance providers, the historical cut point threshold values inferred based at least in part on the noted historical sampled simulation may identify the measure value that is estimated to be sufficient to achieve a two-star rating based at least in part on the shape (e.g., variance, mean, and/or the like) of the 400 randomly-selected medication adherence values, the measure value that is estimated to be sufficient to achieve a three-star rating based at least in part on the shape (e.g., variance, mean, and/or the like) of the 400 randomly-selected medication adherence values, the measure value that is estimated to be sufficient to achieve a four-star rating based at least in part on the shape (e.g., variance, mean, and/or the like) of the 400 randomly-selected medication adherence values, and the measure value that is estimated to be sufficient to achieve a five-star rating based at least in part on the shape (e.g., variance, mean, and/or the like) of the 400 randomly-selected medication adherence values. In some embodiments, determining the historical cut point threshold values inferred based at least in part on a historical sampled simulation includes selecting the historical cut point threshold values in a manner that is configured to divide the measure values described by the historical sampled simulation into n subsets (e.g., n equal subsets), where n is the number of evaluation classifications determined by a corresponding evaluation classification scheme (e.g., given a star rating system that assigns each predictive entity to one of a one-star classification, a two-star classification, a three-star classification, a four-star classification, and a five-star classification, n may equal five in this example).

At step/operation 603, the predictive data analysis computing entity 106 determines a historical cut point distribution for each cut point threshold defined by a corresponding evaluation classification scheme. For example, given a particular evaluation classification scheme that assigns each predictive entity to one of a one-star classification, a two-star classification, a three-star classification, a four-star classification, and a five-star classification, the predictive data analysis computing entity 106 may determine a historical cut point distribution for each of the four cut point thresholds defined by noted five classifications (e.g., a first historical cut point distribution for the two-star classification, a second historical cut point distribution for the three-star classification, a third historical cut point distribution for the four-star classification, and a fourth historical cut point distribution for the five-star classification).

A historical cut point distribution may describe the shape of the predicted historical cut point threshold values for a corresponding cut point threshold across a set of historical sampled simulations. For example, consider a case where ten historical sampled simulations are drawn and where the predicted cut point threshold values for a second cut point threshold (e.g., the cut point threshold for a two-star classification) across the ten historical sampled simulations are 1, 3, 2, 2, 4, 5, 2, 3, 1, 2. In the noted example, the historical cut point distribution for the second cut point threshold may be a histogram that is configured to describe that the predicted historical cut point threshold values for the second cut point threshold across the ten historical sampled simulations includes two values of 1, four values of two, two values of three, one value of four, and one value of five. For example, FIG. 7 depicts historical cut point distributions 701-704 for cut point thresholds Ctp2, Ctp3, Ctp4, and Ctp5 respectively.

At step/operation 604, the predictive data analysis computing entity 106 determines a predicted historical cut point threshold range for each cut point threshold value based at least in part on the historical cut point distribution for the cut point threshold value. For example, given a particular evaluation classification scheme that assigns each predictive entity to one of a one-star classification, a two-star classification, a three-star classification, a four-star classification, and a five-star classification, the predictive data analysis computing entity 106 may determine a historical cut point threshold range for each of the four cut point thresholds defined by noted five classifications (e.g., a first historical cut point threshold range for the cut point threshold associated with two-star classification, a second historical cut point threshold range for the cut point threshold associated with the three-star classification, a third historical cut point threshold range for the cut point threshold associated with the four-star classification, and a fourth historical cut point threshold range for the cut point threshold associated with the five-star classification). For example, as depicted in FIG. 7, the historical cut point threshold range for the historical cut point distribution 704 is [81, 82].

A predicted historical cut point threshold range may describe a defined-frequency range of predicted historical cut point threshold values deemed to for a corresponding cut point threshold as determined based at least in part on the historical cut point distribution for the corresponding cut point threshold, where the defined-frequency range is deemed to account for a predefined ratio (e.g., 60 percent) of the predicted historical cut point threshold values. For example, consider a case where the historical cut point distribution for a second cut point threshold may be a histogram that is configured to describe that the predicted historical cut point threshold values for the second cut point threshold across the ten historical sampled simulations includes two values of 1, four values of two, two values of three, one value of four, and one value of five. In the noted example, the predicted historical cut point threshold range may be [1, 3], as eighty percent of the predicted historical cut point threshold values described by the noted historical cut point distribution fall within the identified range. In some embodiments, identifying a defined-frequency range of predicted historical cut point threshold values for a corresponding cut point threshold as determined based at least in part on the historical cut point distribution for the corresponding cut point threshold includes identifying a range of the predicted historical cut point threshold values for the corresponding cut point threshold that covers a requisite percentage (e.g., 60 percent) of the predicted historical cut point threshold values described by the historical cut point distribution for the corresponding cut point threshold. In some embodiments, identifying a defined-frequency range of predicted historical cut point threshold values for a corresponding cut point threshold as determined based at least in part on the historical cut point distribution for the corresponding cut point threshold includes identifying a range of the predicted historical cut point threshold values for the corresponding cut point threshold that: (i) covers a requisite percentage (e.g., 60 percent) of the predicted historical cut point threshold values described by the historical cut point distribution for the corresponding cut point threshold, and (ii) includes one or more measures of statistical distribution (e.g., a mean, a median, a mode, and/or the like) of the historical cut point distribution for the corresponding cut point threshold.

At step/operation 605, the predictive data analysis compares each predicted historical cut point threshold range for a cut point threshold to a ground-truth historical cut point threshold value for the cut point threshold. A ground-truth historical cut point threshold may describe an observed value of a corresponding cut point threshold. For example, given a cut point threshold value that describes the threshold value of a measure that describes medication adherence for obtaining four-star rating during the year 2017, the ground-truth historical cut point threshold value for the noted cut point threshold value may describe the actual cut point threshold value for medication adherence needed to obtain a four-star rating, a value that is typically announced by CMS one or two years after the relevant rating year. In some embodiments, the predictive data analysis computing entity 106 compares the ground-truth historical cut point threshold for a corresponding cut point threshold with the predicted historical cut point threshold range for the corresponding cut point threshold to determine whether the ground-truth historical cut point threshold falls within the predicted historical cut point threshold range in order to perform calibrations on the initial historical distribution for the cut point threshold if the comparison shows that the ground-truth historical cut point threshold does not fall within the predicted historical cut point threshold range.

At step/operation 606, the predictive data analysis computing entity 106 generates the calibrated historical distribution based at least in part on the results of the comparison performed at step/operation 605. In some embodiments, if the ground-truth historical cut point threshold value for a cut point threshold fails to fall within the predicted historical cut point threshold range for the cut point threshold, the predictive data analysis computing entity 106 makes one or more calibrations to the historical measurement data used to generate the initial historical distribution and/or to the initial historical distributions. Examples of the noted data/distribution calibrations are described below. However, a person of ordinary skill in the relevant technology will recognize that other data/distribution calibrations are available and may be desirable in circumstances if the ground-truth historical cut point threshold value for a cut point threshold fails to fall within the predicted historical cut point threshold range for the cut point threshold.

One example of a data/distribution calibration is removing extreme outliers from an initial historical distribution that is determined based at least in part on historical measurement data that has not been filtered to remove extreme outliers prior to generating the initial historical distribution for the historical measurement data. Another example of a data calibration is adding extreme outliers to an initial historical distribution that is determined based at least in part on historical measurement data that has been filtered to remove extreme outliers prior to generating the initial historical distribution for the historical measurement data. An extreme outlier may be an outlier that lies outside a predefined number of standard deviations of a mean (e.g., five standard deviations of the mean).

As described above, in FIG. 7, the measure simulation results for the 2, 3, 4 and 5 star rating cut points are illustrated in each of the plots. For example, the bottom right hand figure illustrates cut point 5 simulations with likely cut points ranging from 79 to 85 with 81 and 82 being the cut points that occurred most frequently during the simulations. The red vertical line at 82 represents the actual cut points that CMS derived based at least in part on full actual industry data. The vertical line at 81 represents the derived cut points from the same actual industry data but with extreme outliers removed. These simulations appropriately capture both the actual cut points and the cut points where extreme outliers have been removed. Comparing cut point 5 with cut point 2 simulations, the range of possible cut point values is wider for cut point 2. This may be caused by the higher presence of outliers and longer tails on the low-end of the distribution compared to the upper-end of the distribution.

In some embodiments, determining the calibrated historical distribution comprises: for each cut point threshold of a plurality of cut point thresholds: determining a target predicted historical cut point threshold range of the plurality of predicted historical cut point threshold ranges that is associated with the cut point threshold based at least in part on the predefined number of historical sampled simulations, identifying a target ground-truth historical cut point threshold value of the plurality of ground-truth historical cut point threshold values that is associated with the cut point threshold, and determining a per-threshold calibration conclusion based at least in part on comparing the target predicted historical cut point threshold range and the target ground-truth historical cut point threshold value; and generating the calibrated historical distribution based at least in part on each per-threshold calibration conclusion for a cut point threshold of the plurality of cut point thresholds. In some of the noted embodiments, each per-threshold calibration conclusion for a cut point threshold of the plurality of cut point thresholds describes at least one of one or more historical data adjustment operations or one or more historical distribution adjustment operations. In some embodiments, the one or more historical data adjustment operations comprise removing extreme outliers from the historical measurement data. In some embodiments, the one or more historical distribution adjustment operations comprises modifying a distribution type of the initial historical distribution from a current distribution type to an outlier-aware distribution type. In some embodiments, comparing the target predicted historical cut point threshold range and the target ground-truth historical cut point threshold value comprises determining whether the target ground-truth historical cut point threshold value falls within a high-mass region of the target predicted historical cut point threshold range.

In some embodiments, the calibrated historical distribution is selected from a plurality of calibrated historical distributions, each calibrated historical distribution of the plurality of calibrated historical distributions is associated with a historical temporal unit of the plurality of historical temporal units, and determining the projected trend comprises: for each historical temporal unit of the plurality of historical temporal units, determining a historical distribution parameter subset based at least in part on the calibrated historical distribution of the plurality of calibrated historical distributions that is associated with the historical temporal unit, determining a historical trend based at least in part on each historical distribution parameter subset for a temporal historical temporal unit of the plurality of historical temporal units, and determining the projected trend based at least in part on the historical trend.

Returning to FIG. 4, at step/operation 403, the predictive data analysis computing entity 106 determines one or more projected distributions for the measure based at least in part on a projected trend for the measure, where the projected trend is determined based at least in part on the calibrated historical distribution. In some embodiments, the predictive data analysis computing entity 106 processes the calibrated historical distributions associated with the measure across a number of historical temporal units (e.g., five historical years) associated with the historical measurement data for the measure in order to determine a projected distribution for each of one or more projected temporal units. For example, before or during the year 2020, the predictive data analysis computing entity 106 may process the calibrated historical distribution for a medication adherence measure for the year 2015, the calibrated historical distribution for the medication adherence measure for the year 2016, the calibrated historical distribution for the medication adherence measure for the year 2017, the calibrated historical distribution for the medication adherence measure for the year 2018, and the calibrated historical distribution for the medication adherence measure for the year 2019 in order to generate a projected distribution for the medication adherence measure for the year 2020 and the medication adherence measure for the year 2021.

In some embodiments, step/operation 403 may be performed in accordance with the process depicted in FIG. 8. The process depicted in FIG. 8 begins at step/operation 801 when the predictive data analysis computing entity 106 identifies the calibrated historical distributions for the measure across a selected range of historical temporal units (e.g., identify the calibrated historical distribution for the measure for each year of a group of historical years).

A calibrated historical distribution may describe a distribution of applicable measure values for a predictive entity segment that is generated by one of the following: (i) determining that a corresponding initial historical distribution is sufficiently descriptive of ground-truth historical cut point thresholds associated with the measure and thus adopting the corresponding initial historical distribution as the calibrated historical distribution, or (ii) determining that a corresponding initial historical distribution is not sufficiently descriptive of ground-truth historical cut point thresholds associated with the measure and thus applying data/distribution calibrations on the historical measurement data used to determine the corresponding initial historical distribution and/or on the corresponding initial historical distribution in order to generate the calibrated historical distribution. For example, given a measure that describes medication adherence values for the year 2017, the calibrated historical distribution may be determined by: (i) determining whether an initial historical distribution for the measure is sufficiently descriptive of ground-truth historical cut point thresholds associated with the measure; (ii) in response to determining that the initial historical distribution for the measure is sufficiently descriptive of ground-truth historical cut point thresholds associated with the measure, adopting the initial historical distribution as the calibrated historical distribution; and (iii) in response to determining that the initial historical distribution for the measure is not sufficiently descriptive of ground-truth historical cut point thresholds associated with the measure, performing at least one of: (i) adjusting the data used to generate the initial historical distribution and using the adjusted data to generate the calibrated historical distribution, or (ii) modifying the parameters and/or the type of the initial historical distribution to generate the calibrated historical distribution.

At step/operation 802, the predictive data analysis computing entity 106 generates a historical trend based at least in part on the calibrated historical distributions. The historical trend may describe one or more desired values/parameters described by the calibrated historical distributions across various historical temporal units, where the desired values/parameters may be determined based at least in part on a determined projected distribution. In some embodiments, given a projected distribution with n parameters, the historical trend may describe a first graph that describes the value of the first parameter of the n parameters across the calibrated historical distributions for the range of historical temporal units, a second graph that describes the value of the second parameter of the n parameters across the calibrated historical distributions for the range of historical temporal units, and all the way to an nth graph that describes the value of the nth parameter of the n parameters across the calibrated historical distributions for the range of historical temporal units. For example, given a projected normal distribution and given calibrated historical distributions for each of the years 2014-2019, the historical trend may include a first graph that describes the mean of the calibrated historical distribution for the year 2014, the mean of the calibrated historical distribution for the year 2015, the mean of the calibrated historical distribution for the year 2016, the mean of the calibrated historical distribution for the year 2017, the mean of the calibrated historical distribution for the year 2018, and the mean of the calibrated historical distribution for the year 2019, as well as a second graph that describes the variance of the calibrated historical distribution for the year 2014, the variance of the calibrated historical distribution for the year 2015, the variance of the calibrated historical distribution for the year 2016, the variance of the calibrated historical distribution for the year 2017, the variance of the calibrated historical distribution for the year 2018, and the variance of the calibrated historical distribution for the year 2019. In some embodiments, the type of the projected distribution is determined based at least in part on the type of the calibrated historical distribution for a selected historical temporal unit (e.g., a latest historical temporal unit, such as the year 2019 in the example referring to the calibrated historical distributions for each of the years 2014-2019).

At step/operation 803, the predictive data analysis computing entity 106 determines a projected trend based at least in part on the historical trend. The projected trend may describe projected values for the one or more desired values/parameters described by a corresponding historical trend across one or more projected temporal units (e.g., one or more future years). For example, consider a historical trend that includes a first graph that describes the mean of the calibrated historical distribution for the year 2014, the mean of the calibrated historical distribution for the year 2015, the mean of the calibrated historical distribution for the year 2016, the mean of the calibrated historical distribution for the year 2017, the mean of the calibrated historical distribution for the year 2018, and the mean of the calibrated historical distribution for the year 2019, as well as a second graph that describes the variance of the calibrated historical distribution for the year 2014, the variance of the calibrated historical distribution for the year 2015, the variance of the calibrated historical distribution for the year 2016, the variance of the calibrated historical distribution for the year 2017, the variance of the calibrated historical distribution for the year 2018, and the variance of the calibrated historical distribution for the year 2019. In the noted example, the projected trend may describe the mean of the projected distribution for the year 2020, the mean of the projected distribution for the year 2021, the variance of the projected distribution for the year 2020, and the variance of the projected distribution for the year 2021. In some embodiments, to generate the historical trend and/or the projected trend, one or more trending methods are utilized. Examples of trending methods include linear trending (e.g., for measures with steady improvement), exponential trending, and logarithmic trending (e.g., to account for measures that are improving over the years but are starting to level-off across time). In some embodiments, the $R^2$ of each trending method is used to determine which method to use best for automation purposes.

An operational example of determining a historical trend 901A-901B and a projected trend 902A-902B is depicted in FIG. 9. As depicted in FIG. 9, the historical trend includes the historical trend component 901A that describes the historical trend of a variance parameter across the historical temporal units 2012-2017 as well as the historical trend component 901B that describes the historical trend of a mean parameter across the historical temporal units 2012-2017, while the projected trend includes the projected trend component 902A that describes the projected trend of a variance parameter across the projected temporal units 2018-2019 as well as the projected trend component 902B that describes the projected trend of a mean parameter across the projected temporal units 2018-2019.

At step/operation 804, the predictive data analysis computing entity 106 determines a projected distribution for each projected temporal unit of one or more projected temporal units based at least in part on the projected trend. A projected distribution may describe a predicted distribution of measure values for a corresponding measure in a projected temporal unit (e.g., a future year). In some embodiments, the distribution type of the projected distribution may be determined based at least in part on a distribution type of a calibrated historical distribution that is associated with the corresponding measure as well as with a latest historical temporal unit at the time of determining the projected distribution. In some embodiments, the parameters of the projected distribution may be determined based at least in part on the projected trend for a set of projected temporal units that include the corresponding temporal unit for the projected distribution. For example, as depicted in FIG. 9, the projected distribution for the year 2018 may have a variance of 32.25 and a mean of 78.5, while the projected distribution for the year 2019 may have a variance of 31.5 and a mean of 80.1.

Returning to FIG. 4, at step/operation 404, the predictive data computing entity 106 determines a set of projected cut point threshold predictions for each projected temporal unit (e.g., each future year) based at least in part on the projected distribution for the projected temporal unit. In some embodiments, the set of projected cut point threshold predictions for a projected temporal unit include a projected cut point threshold prediction for each cut point threshold defined by an applicable evaluation classification scheme. For example, given a star rating system that assigns each predictive entity to one of a one-star classification, a two-star classification, a three-star classification, a four-star classification, and a five-star classification, and further given a prediction range of two prospective years, the predictive data analysis computing entity 106 may determine a projected cut point threshold point for the cut point-threshold value associated with the two-star classification for the first prospective year, a projected cut point threshold point for the cut point-threshold value associated with the two-star classification for the second prospective year, a projected cut point threshold point for the cut point-threshold value associated with the three-star classification for the first prospective year, a projected cut point threshold point for the cut point-threshold value associated with the three-star classification for the second prospective year, a projected cut point threshold point for the cut point-threshold value associated with the four-star classification for the first prospective year, a projected cut point threshold point for the cut point-threshold value associated with the four-star classification for the second prospective year, a projected cut point threshold point for the cut point-threshold value associated with the five-star classification for the first prospective year, and a projected cut point threshold point for the cut point-threshold value associated with the five-star classification for the second prospective year.

In some embodiments, to generate a projected cut point threshold prediction for a corresponding projected temporal unit, step/operation 404 may be performed in accordance with the process depicted in FIG. 10. The process depicted in FIG. 10 begins at step/operation 1001 when the predictive data analysis computing entity 106 identifies the projected distribution for the projected temporal unit (e.g., for a particular prospective year).

At step/operation 1002, the predictive data analysis computing entity 106 determines a predefined number of projected sampled simulations based at least in part on the identified projected distribution. For example, in some embodiments, the predictive data analysis computing entity 106 proceeds to determine 1,000 projected sampled simulation based at least in part on the projected distribution.

A projected sampled simulation describes a subset of the measure values described by the projected distribution. For example, given a measure that describes medication adherence for a group of health insurance providers for a particular year, a projected sampled simulation may describe projected medication adherence values for a subset of the group of health insurance providers, for example for 400 health insurance providers in a particular prospective year. In some embodiments, determining a projected sampled simulation based at least in part on a projected distribution is performed based at least in part on a random sampling of values from the projected distribution, where the random sampling is performed in accordance with the probability relationships defined by the type of the projected distribution and the parameters of the projected distribution. In some embodiments, a predefined number of projected simulations are generated for each particular measure across a particular projected temporal unit and used to determine a particular projected cut point threshold prediction for the measure and the particular projected temporal unit.

At step/operation 1003, the predictive data analysis computing entity 106 determines a set of projected cut point threshold values for each projected sampled simulation. A projected cut point threshold value may describe a minimum measure value that is estimated based at least in part on the distribution of measurement values across a corresponding projected sampled simulation to be sufficient to achieve a particular evaluation classification. For example, when a projected sampled simulation describes 400 randomly-selected medication adherence values for 400 health insurance providers, the projected cut point threshold values inferred based at least in part on the noted projected sampled simulation may describe the measure value that is estimated to be sufficient to achieve a two-star rating based at least in part on the shape (e.g., variance, mean, and/or the like) of the 400 randomly-selected medication adherence values, the measure value that is estimated to be sufficient to achieve a three-star rating based at least in part on the shape (e.g., variance, mean, and/or the like) of the 400 randomly-selected medication adherence values, the measure value that is estimated to be sufficient to achieve a four-star rating based at least in part on the shape (e.g., variance, mean, and/or the like) of the 400 randomly-selected medication adherence values, and the measure value that is estimated to be sufficient to achieve a four-star rating based at least in part on the shape (e.g., variance, mean, and/or the like) of the 400 randomly-selected medication adherence values. In some embodiments, determining the projected cut point threshold values inferred based at least in part on a projected sampled simulation includes selecting the projected cut point threshold values in a manner that is configured to divide the measure values described by the projected sampled simulation into n subsets (e.g., n equal subsets), where n is the number of evaluation classifications determined by a corresponding evaluation classification scheme (e.g., given a star rating system that assigns each predictive entity to one of a one-star classification, a two-star classification, a three-star classification, a four-star classification, and a five-star classification, n may equal five in this example).

At step/operation 1004, the predictive data analysis computing entity 106 determines a projected cut point distribution for each cut point threshold defined by a corresponding evaluation classification scheme. For example, given a particular evaluation classification scheme that assigns each predictive entity to one of a one-star classification, a two-star classification, a three-star classification, a four-star classification, and a five-star classification, the predictive data analysis computing entity 106 may determine a projected cut point distribution for each of the four cut point thresholds defined by noted five classifications (e.g., a first projected cut point distribution for the two-star classification, a second projected cut point distribution for the three-star classification, a third projected cut point distribution for the four-star classification, and a fourth projected cut point distribution for the five-star classification).

A projected cut point distribution may describe the shape of the projected cut point threshold values for a corresponding cut point threshold across a set of sampled projected simulations. For example, consider a case where ten sampled projected simulations are drawn and where the predicted cut point threshold values for a second cut point threshold (e.g., the cut point threshold for a two-star classification) across the ten sampled projected simulations is 1, 3, 2, 2, 4, 5, 2, 3, 1, 2. In the noted example, the projected cut point distribution for the second cut point threshold may be a histogram that is configured to describe that the projected cut point threshold values for the second cut point threshold across the ten sampled projected simulations includes two values of 1, four values of two, two values of three, one value of four, and one value of five. For example, FIG. 11 depicts projected cut point distributions 1101-1104 for cut point thresholds Ctp2, Ctp3, Ctp4, and Ctp5 respectively.

At step/operation 1005, the predictive data analysis computing entity 106 determines a projected cut point threshold range for each cut point threshold value based at least in part on the projected cut point distribution for the cut point threshold value. For example, given a particular evaluation classification scheme that assigns each predictive entity to one of a one-star classification, a two-star classification, a three-star classification, a four-star classification, and a five-star classification, the predictive data analysis computing entity 106 may determine a projected cut point threshold range for each of the four cut point thresholds defined by noted five classifications (e.g., a first projected cut point threshold range for the cut point threshold associated with two-star classification, a second projected cut point threshold range for the cut point threshold associated with the three-star classification, a third projected cut point threshold range for the cut point threshold associated with the four-star classification, and a fourth projected cut point threshold range for the cut point threshold associated with the five-star classification).

A projected cut point threshold range describes a defined-frequency and/or a centralized range of projected cut point threshold values for a corresponding cut point threshold as determined based at least in part on the projected cut point distribution for the corresponding cut point threshold. For example, consider a case where the projected cut point distribution for a second cut point threshold may be a histogram that is configured to describe that the projected cut point threshold values for the second cut point threshold across the ten sampled projected simulations includes two values of 1, four values of two, two values of three, one value of four, and one value of five. In the noted example, the projected cut point threshold range may be [1, 3], as eighty percent of the projected cut point threshold values described by the noted projected cut point distribution fall within the identified range. In some embodiments, identifying a defined-frequency range of projected cut point threshold values for a corresponding cut point threshold as determined based at least in part on the projected cut point distribution for the corresponding cut point threshold includes identifying a range of the projected cut point threshold values for the corresponding cut point threshold that covers a requisite percentage (e.g., 60 percent) of the projected cut point threshold values described by the projected cut point distribution for the corresponding cut point threshold. In some embodiments, identifying a defined-frequency range of projected cut point threshold values for a corresponding cut point threshold as determined based at least in part on the projected cut point distribution for the corresponding cut point threshold includes identifying a range of the projected cut point threshold values for the corresponding cut point threshold that: (i) covers a requisite percentage (e.g., 60 percent) of the projected cut point threshold values described by the projected cut point distribution for the corresponding cut point threshold, and (ii) includes one or more measures of projected distribution (e.g., a mean, a median, a mode, and/or the like) of the projected cut point threshold values described by the projected cut point distribution for the corresponding cut point threshold.

At step/operation 1006, the predictive data analysis computing entity 106 determines the projected cut point threshold prediction based at least in part on the projected cut point threshold range. The projected cut point threshold prediction may describe a predictive conclusion about the predicted utility of achieving a particular measure value to achieving a particular cut point threshold. For example, the projected cut point threshold prediction may describe a range of measure values that are predicted to have a high probability of achieving a particular cut point threshold. As another example, projected cut point threshold prediction may describe a range of measure values that are predicted to have a defined probability of achieving a particular cut point threshold.

As described above, in FIG. 11, the set of cut points from all the runs of one of a projected star year is illustrated for each cut point level. The dark solid blue line represents the set of cut points that occurs most frequently and to be use used as the point estimate predicted cut point. The dotted vertical lines represent the lower and upper set of cut points that are also likely. These can be used as best and worst case scenarios but would still represent a set of plausible/likely cut points. If it is determined that this distribution is likely to have outliers and/or longer distribution tails in the next two star years, these are also added into each simulation run. Although Beta and Weibull distributions can capture a tail end distribution, sometimes the tail is not long enough so a short Uniform distribution is added on to simulate a longer-tail. Determination of these special inclusions (e.g., outliers and/or longer tails) is determined by analyzing the presence of outliers and/or longer tails in the last five years and determining whether it is lessening each year. Also, in determining whether to include special inclusions discussed above, additional external factors may be considered such as alterations in the current CMS cut points methodology or alterations in the current measure methodology.

In some embodiments, to determine a set of projected cut point threshold predictions for a projected temporal unit (e.g., a future year) based at least in part on the projected distribution for the projected temporal unit, the predictive data analysis computing entity 106 performs the following operations: (i) determining a predefined number of projected sampled simulations based at least in part on the projected distribution, (ii) for each projected sampled simulation, determining a projected cut point threshold prediction vector that describes all projected cut point threshold predictions for all cut point thresholds as determined based on the projected sampled distribution, (iii) determining a median cut point threshold prediction vector, where each value of the median cut point threshold prediction vector describes the median value for all projected cut point threshold predictions for a corresponding cut point threshold across all projected cut point threshold prediction vectors for all projected sampled distributions, (iv) for each projected cut point threshold prediction vector, determining a measure of distance (e.g., a least-squares-based measure of distance) of the projected cut point threshold prediction vector from the median cut point threshold prediction vector, and (v) selecting the set of projected cut point threshold predictions based at least in part on all of the projected cut point threshold predictions for all cut point thresholds that are described by a projected cut point threshold prediction vector having a lowest measure of distance among all projected cut point threshold prediction vectors that satisfy one or more projected cut point threshold prediction vector eligibility criteria. In some embodiments, the projected cut point threshold prediction vector eligibility criteria include at least one of the following: (i) a first projected cut point threshold prediction vector eligibility criterion that describes a maximum allowable distance between projected cut point threshold predictions described by a projected cut point threshold prediction vector, and (ii) a second projected cut point threshold prediction vector eligibility criterion that describes ranges for each projected cut point threshold prediction described by a projected cut point threshold prediction vector.

Returning to FIG. 4, at step/operation 405, the predictive data analysis computing entity 106 performs one or more prediction-based actions based at least in part on the projected cut point threshold predictions. For example, in some embodiments, the predictive data analysis computing entity 106 generates one or more automated alerts based at least in part on the projected cut point threshold predictions. As another example, in some embodiments, the predictive data analysis computing entity 106 performs one or more automated operational adjustment actions based at least in part on the projected cut point threshold predictions. As yet another example, in some embodiments, the predictive data analysis computing entity 106 performs one or more automated operational load balancing actions based at least in part on the projected cut point threshold predictions.

In some embodiments, the predictive data analysis computing entity 106 generates a prediction output user interface that enables retrieving high-likelihood projected cut point thresholds for a selected year, a selected cut point threshold, and a selected measure, where the high-likelihood projected cut point thresholds for a selected year, a selected cut point threshold, and a selected measure may be determined based at least in part on the projected cut point threshold prediction for the selected year, the selected cut point threshold, and the selected measure.

For example, FIG. 12 depicts a prediction output user interface 1200 that describes (using user interface element 1211) a predicted range of the projected cut point threshold value for the measure selected using the user interface element 1201, the year selected using the user interface element 1202, and the cut point selected using the user interface element 1203. FIG. 12 further describes (using user interface element 1212) a high-likelihood projected cut point threshold value for the measure selected using the user interface element 1201, the year selected using the user interface element 1202, and the cut point selected using the user interface element 1203. FIG. 12 further describes (using user interface element 1213) recommended actions for achieving the requisite measure value for the measure selected using the user interface element 1201 during the year selected using the user interface element 1202 and in relation to the cut point selected using the user interface element 1203.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
  generating, by one or more processors, a plurality of projected cut point threshold projections for a predictive data analysis system by:
    determining an initial historical distribution for a measure based at least in part on historical measurement data associated with the measure,
    determining a plurality of historical sampled simulations, wherein a historical sampled simulation of the plurality of historical sampled simulations comprises a random sampling of one or more values from the initial historical distribution,
    determining one or more predicted historical cut point threshold ranges based at least in part on the plurality of historical sampled simulations,
    determining a calibrated historical distribution for the measure based at least in part on comparing the one or more predicted historical cut point threshold ranges and one or more ground-truth historical cut point threshold values, determining a projected trend for a predictive distribution for the measure based on the calibrated historical distribution, determining one or more projected distributions for the measure based at least in part on the projected trend for the predictive distribution, and generating the plurality of projected cut point threshold projections for the measure based at least in part on a predefined number of projected sampled simulations, wherein the predefined number of projected sampled simulations is determined based at least in part on the one or more projected distributions;

setting, by the one or more processors, a plurality of optimal threshold values for the predictive data analysis system based at least in part on the plurality of projected cut point threshold projections;

generating, by the one or more processors and using a machine learning model, a probabilistic classification for the predictive data analysis system;

generating, by the one or more processors and using the machine learning model, a qualitative classification for the predictive data analysis system based at least in part on the probabilistic classification and the plurality of optimal threshold values; and performing, by the one or more processors, one or more load balancing operations for the predictive data analysis system by allocating one or more computational resources based at least in part on the qualitative classification.

2. The computer-implemented method of claim 1, wherein determining the calibrated historical distribution comprises:

determining a target predicted historical cut point threshold range of the one or more predicted historical cut point threshold ranges that is associated with a cut point threshold based at least in part on a predefined number of historical sampled simulations;

identifying a target ground-truth historical cut point threshold value of the one or more ground-truth historical cut point threshold values that is associated with the cut point threshold;

determining a per-threshold calibration conclusion based at least in part on comparing the target predicted historical cut point threshold range and the target ground-truth historical cut point threshold value; and determining the calibrated historical distribution based at least in part on the per-threshold calibration conclusion for the cut point threshold.

3. The computer-implemented method of claim 2, wherein the per-threshold calibration conclusion for the cut point threshold describes at least one of one or more historical data adjustment operations or one or more historical distribution adjustment operations.

4. The computer-implemented method of claim 3, wherein the one or more historical data adjustment operations comprise removing extreme outliers from the historical measurement data.

5. The computer-implemented method of claim 3, wherein the one or more historical distribution adjustment operations comprise modifying a distribution type of the initial historical distribution from a current distribution type to an outlier-aware distribution type.

6. The computer-implemented method of claim 3, wherein comparing the target predicted historical cut point threshold range and the target ground-truth historical cut point threshold value comprises determining whether the target ground-truth historical cut point threshold value falls within a high-mass region of the target predicted historical cut point threshold range.

7. The computer-implemented method of claim 1, wherein:

the calibrated historical distribution is selected from a plurality of calibrated historical distributions, a calibrated historical distribution of the plurality of calibrated historical distributions is associated with a historical temporal unit of a plurality of historical temporal units, and determining the projected trend for a predictive distribution for the measure comprises:

determining, by the one or more processors, a historical distribution parameter subset for the historical temporal unit based at least in part on the calibrated historical distribution of the plurality of calibrated historical distributions that is associated with the historical temporal unit, determining, by the one or more processors, a historical trend based at least in part on the historical distribution parameter subset for the historical temporal unit, and determining, by the one or more processors, the projected trend based at least in part on the historical trend.

8. The computer-implemented method of claim 7, wherein the projected trend describes a projected distribution parameter subset for a projected temporal unit of one or more projected temporal units.

9. The computer-implemented method of claim 8, wherein the one or more projected distributions comprise a projected distribution for the projected temporal unit of the one or more projected temporal units that is determined based at least in part on the historical distribution parameter subset for the projected temporal unit.

10. A system comprising:

one or more processors; and at least one memory storing processor-executable instructions that, when executed by any one or more of the one or more processors, causes the one or more processors to perform operations comprising:

generating a plurality of projected cut point threshold projections for a predictive data analysis system by:

determining an initial historical distribution for a measure based at least in part on historical measurement data associated with the measure, determining a plurality of historical sampled simulations, wherein a historical sampled simulation of the plurality of historical sampled simulations comprises a random sampling of one or more values from the initial historical distribution, determining one or more predicted historical cut point threshold ranges based at least in part on the plurality of historical sampled simulations, determining a calibrated historical distribution for the measure based at least in part on comparing the one or more predicted historical cut point threshold ranges and one or more ground-truth historical cut point threshold values, determining a projected trend for a predictive distribution for the measure based at least in part on the calibrated historical distribution, determining one or more projected distributions for the measure based at least in part on the projected trend for the predictive distribution, and generating the plurality of projected cut point threshold projections for the measure based at least in part on a predefined number of projected sampled simulations, wherein the predefined number of projected sampled simulations is determined based at least in part on the one or more projected distributions;

setting a plurality of optimal threshold values for the predictive data analysis system based at least in part on the plurality of projected cut point threshold projections;

generating, using a machine learning model, a probabilistic classification for the predictive data analysis system;

generating, using the machine learning model, a qualitative classification for the predictive data analysis system based at least in part on the probabilistic classification and the plurality of optimal threshold values; and perform one or more load balancing operations for the predictive data analysis system by allocating one or more computational resources based on the qualitative classification.

11. The system of claim 10, wherein determining the calibrated historical distribution comprises:

determining a target predicted historical cut point threshold range of the one or more predicted historical cut point threshold ranges that is associated with a cut point threshold based at least in part on a predefined number of historical sampled simulations;

identifying a target ground-truth historical cut point threshold value of the one or more ground-truth historical cut point threshold values that is associated with the cut point threshold;

determining a per-threshold calibration conclusion based at least in part on comparing the target predicted historical cut point threshold range and the target ground-truth historical cut point threshold value; and determining the calibrated historical distribution based at least in part on the per-threshold calibration conclusion for the cut point threshold.

12. The system of claim 11, wherein the per-threshold calibration conclusion for the cut point threshold describes at least one of one or more historical data adjustment operations or one or more historical distribution adjustment operations.

13. The system of claim 12, wherein the one or more historical distribution adjustment operations comprise modifying a distribution type of the initial historical distribution from a current distribution type to an outlier-aware distribution type.

14. The system of claim 12, wherein comparing the target predicted historical cut point threshold range and the target ground-truth historical cut point threshold value comprises determining whether the target ground-truth historical cut point threshold value falls within a high-mass region of the target predicted historical cut point threshold range.

15. The system of claim 10, wherein:

the calibrated historical distribution is selected from a plurality of calibrated historical distributions, a calibrated historical distribution of the plurality of calibrated historical distributions is associated with a historical temporal unit of a plurality of historical temporal units, and determining the projected trend comprises:

determining a historical distribution parameter subset for the historical temporal unit based at least in part on the calibrated historical distribution of the plurality of calibrated historical distributions that is associated with the historical temporal unit, determining a historical trend based at least in part on the historical distribution parameter subset for the historical temporal unit, and determining the projected trend based at least in part on the historical trend.

16. The system of claim 15, wherein the projected trend describes a projected distribution parameter subset for a projected temporal unit of one or more projected temporal units.

17. The system of claim 16, wherein the one or more projected distributions comprise a projected distribution for the projected temporal unit of the one or more projected temporal units that is determined based at least in part on the historical distribution parameter subset for the projected temporal unit.

18. One or more non-transitory computer-readable storage media including instructions that, when executed by one or more processors, cause the one or more processors to:

generate a plurality of projected cut point threshold projections for a predictive data analysis system by:

determining an initial historical distribution for a measure based at least in part on historical measurement data associated with the measure, determining a plurality of historical sampled simulations, wherein a historical sampled simulation comprises a random sampling of values from the initial historical distribution, determining one or more predicted historical cut point threshold ranges based at least in part on the plurality of historical sampled simulations, determining a calibrated historical distribution for the measure based at least in part on comparing the one or more predicted historical cut point threshold ranges and one or more ground-truth historical cut point threshold values, determining a projected trend for a predictive distribution for the measure based on the calibrated historical distribution, determining one or more projected distributions for the measure based at least in part on the projected trend for the predictive distribution, and generating the plurality of projected cut point threshold projections for the measure based at least in part on a predefined number of projected sampled simulations, wherein the predefined number of projected sampled simulations are determined based at least in part on the one or more projected distributions;

set a plurality of optimal threshold values for the predictive data analysis system based at least in part on the plurality of projected cut point threshold projections;

generate, using a machine learning model, a probabilistic classification for the predictive data analysis system;

generate, using the machine learning model, a qualitative classification for the predictive data analysis system based at least in part on the probabilistic classification and the plurality of optimal threshold values; and perform one or more load balancing operations for the predictive data analysis system by allocating one or more computational resources based at least in part on the qualitative classification.

19. The one or more non-transitory computer-readable storage media of claim 18, wherein determining the calibrated historical distribution comprises:

determining a target predicted historical cut point threshold range of the one or more predicted historical cut point threshold ranges that is associated with a cut point threshold based at least in part on a predefined number of historical sampled simulations;

identifying a target ground-truth historical cut point threshold value of the one or more ground-truth historical cut point threshold values that is associated with the cut point threshold;

determining a per-threshold calibration conclusion based at least in part on comparing the target predicted historical cut point threshold range and the target ground-truth historical cut point threshold value; and determining the calibrated historical distribution based at least in part on the per-threshold calibration conclusion for the cut point threshold.

20. The one or more non-transitory computer-readable storage media of claim 18, wherein:

the calibrated historical distribution is selected from a plurality of calibrated historical distributions, a calibrated historical distribution of the plurality of calibrated historical distributions is associated with a historical temporal unit of a plurality of historical temporal units, and determining the projected trend comprises:

determining a historical distribution parameter subset for the historical temporal unit based at least in part on the calibrated historical distribution of the plurality of calibrated historical distributions that is associated with the historical temporal unit, determining a historical trend based at least in part on the historical distribution parameter subset for the historical temporal unit, and determining the projected trend based at least in part on the historical trend.

* * * * *